United States Patent
MacHardy, Jr. et al.

(10) Patent No.: US 6,578,160 B1
(45) Date of Patent: Jun. 10, 2003

(54) FAULT TOLERANT, LOW LATENCY SYSTEM RESOURCE WITH HIGH LEVEL LOGGING OF SYSTEM RESOURCE TRANSACTIONS AND CROSS-SERVER MIRRORED HIGH LEVEL LOGGING OF SYSTEM RESOURCE TRANSACTIONS

(76) Inventors: Earle Trounson MacHardy, Jr., 5812 Shannas Way, Durham, NC (US) 27713-2031; Miles Aram de Forest, 6921 Iron Gate Dr., Bahama, NC (US) 27503

(*) Notice: Subject to any disclaimer, the term of this patent is extended or adjusted under 35 U.S.C. 154(b) by 0 days.

(21) Appl. No.: 09/580,539

(22) Filed: May 26, 2000

(51) Int. Cl.[7] ................................. H02H 3/05
(52) U.S. Cl. ..................... 714/43; 711/176; 709/223
(58) Field of Search ............... 714/43, 5, 6, 10, 714/11, 20; 711/114, 176; 709/223

(56) References Cited

U.S. PATENT DOCUMENTS

| | | | |
|---|---|---|---|
| 5,089,958 A | * 2/1992 | Horton et al. | 714/5 |
| 5,974,503 A | * 10/1999 | Venkatesh et al. | 711/114 |
| 6,014,674 A | * 1/2000 | McCargar | 707/202 |
| 6,330,690 B1 | * 12/2001 | Nouri et al. | 714/23 |
| 6,446,129 B1 | * 9/2002 | DeForest et al. | 709/230 |

* cited by examiner

*Primary Examiner*—Robert Beausoliel
*Assistant Examiner*—Rita A Ziemer
(74) *Attorney, Agent, or Firm*—Davis & Bujold, P.L.L.C.

(57) ABSTRACT

A high level transaction logging mechanism for use in a shared system resource, such as a file server, and a high level, cross server transaction mirror logging mechanism. A system resource includes first and second blade processors, each including a first processor transforming high level operations into corresponding low level operations and a transaction logging mechanism including a log generator for extracting high level operation information relating to each system resource request and a transaction log for storing the high level operation information. The logging mechanism is responsive to restoration of operation of the system resource for reading the high level operation information from the transaction log and restoring the state of execution of the first processor. Each transaction logging mechanism further includes a transaction log mirroring mechanism residing in the other processor and communicating with the corresponding log generator for receiving and storing mirror copies of the high level system resource operation information relating to each system resource request. Each transaction log mirroring mechanism is responsive to the restoration of operation of the system resource after a failure of system resource operations for reading the high level system resource operation information relating to each system resource request directed to the corresponding processor and restoring the state of execution of the corresponding processor.

16 Claims, 4 Drawing Sheets

FAULT TOLERANT, LOW LATENCY SYSTEM RESOURCE WITH HIGH LEVEL LOGGING OF SYSTEM RESOURCE TRANSACTIONS AND CROSS-SERVER MIRRORED HIGH LEVEL LOGGING OF SYSTEM RESOURCE TRANSACTIONS

CROSS REFERENCES TO RELATED APPLICATIONS

The present Application is related to:

U.S. patent application Ser. No. 09/580,187 filed by Robert Lawrence Fair for A MULTIPLE HIERARICHAL/PEER DOMAIN FILE SERVER WITH DOMAIN BASED, CROSS DOMAIN COOPERATIVE FAULT HANDLING MECHANISMS;

U.S. patent application Ser. No. 09/588,186 filed by Robert Lawrence Fair for A FAULT HANDLING MONITOR TRANSPARENTLY USING MULTIPLE TECHNOLOGIES FOR FAULT HANDLING IN A MULTIPLE HIERARICHAL/PEER DOMAIN FILE SERVER WITH DOMAIN CENTERED, CROSS DOMAIN COOPERATIVE FAULT HANDLING MECHANISMS;

U.S. patent application Ser. No. 09/579,428 filed by John A. Scott and James Gregory Jones for a FAULT TOLERANT SHARED SYSTEM RESOURCE WITH COMMUNICATIONS PASSTHROUGH PROVIDING HIGH AVAILABILITY COMMUNICATIONS;

U.S. patent application Ser. No. 09/579,427 filed by Mark Andrew O'Connell for TOPOLOGICAL DATA CATEGORIZATION AND FORMATTING FOR A MASS STORAGE SYSTEM;

U.S. patent application Ser. No. 09/579,671 filed by Mark Andrew O'Connell for DATA TYPE AND TOPOLOGICAL DATA CATEGORIZATION AND ORDERING FOR A MASS STORAGE SYSTEM; and, U.S. patent application Ser. No. filed by Miles Aram de Forest for FAULT TOLERANT SYSTEM SHARED SYSTEM RESOURCE WITH STATE MACHINE LOGGING.

FIELD OF THE INVENTION

The present invention relates to a system and method for high level transaction logging mechanism in a fault tolerant, low latency shared system resource, such as a networked file server, and, in particular, a cross-server high level mirrored transaction logging mechanism for use in a multiple server system resource.

BACKGROUND OF THE INVENTION

A continuing problem in computer systems is in providing secure, fault tolerant resources, such as communications and data storage resources, such that communications between the computer system and clients or users of the computer system are maintained in the event of failure and such that data is not lost and can be recovered or reconstructed without loss in the event of a failure. This problem is particularly severe in networked systems wherein a shared resource, such as a system data storage facility, is typically comprised of one or more system resources, such as file servers, shared among a number of clients and accessed through the system network. A failure in a shared resource, such as in the data storage functions of a file server or in communications between clients of the file server and the client file systems supported by the file server, can result in failure of the entire system. This problem is particularly severe in that the volume of data and communications and the number of data transactions supported by a shared resource such as a file server are significantly greater than within a single client system, resulting in significantly increased complexity in the resource, in the data transactions and in the client/server communications. This increased complexity results in increased probability of failure and increased difficulty in recovering from failures. In addition, the problem is multidimensional in that a failure may occur in any of a number of resource components or related functions, such as in a disk drive, in a control processor, or in the network communications. Also, it is desirable that the shared resource communications and services continue to be available despite failures in one or more components, and that the operations of the resource be preserved and restored for both operations and transactions that have been completed and for operations and transactions that are being executed when a failure occurs.

Considering networked file server systems as a typical example of a shared system resource of the prior art, the filer server systems of the prior art have adopted a number of methods for achieving fault tolerance in client/server communications and in the file transaction functions of the file server, and for data recovery or reconstruction. These methods are typically based upon redundancy, that is, the provision of duplicate system elements and the replacement of a failed element with a duplicate element or the creation of duplicate copies of information to be used in reconstructing lost information.

For example, many systems of the prior art incorporate industry standard RAID technology for the preservation and recovery of data and file transactions, wherein RAID technology is a family of methods for distributing redundant data and error correction information across a redundant array of disk drives. A failed disk drive may be replaced by a redundant drive, and the data in the failed disk may be reconstructed from the redundant data and error correction information. Other systems of the prior art employ multiple, duplicate parallel communications paths or multiple, duplicate parallel processing units, with appropriate switching to switch communications or file transactions from a failed communications path or file processor to an equivalent, parallel path or processor, to enhance the reliability and availability of client/file server communications and client/client file system communications. These methods, however, are costly in system resources, requiring the duplication of essential communication paths and processing paths, and the inclusion of complex administrative and synchronization mechanisms to manage the replacement of failed elements by functioning elements. Also, and while these methods allow services and functions to be continued in the event of failures, and RAID methods, for example, allow the recovery or reconstruction of completed data transactions, that is, transactions that have been committed to stable storage on disk, these methods do not support the reconstruction or recovery of transactions lost due to failures during execution of the transactions.

As a consequence, yet other methods of the prior art utilize information redundancy to allow the recovery and reconstruction of transactions lost due to failures occurring during execution of the transactions. These methods include caching, transaction logging and mirroring wherein caching is the temporary storage of data in memory in the data flow path to and from the stable storage until the data transaction is committed to stable storage by transfer of the data into stable storage, that is, a disk drive, or read from stable storage and transferred to a recipient. Transaction logging, or journaling, temporarily stores information describing a data transaction, that is, the requested file server operation, until the data transaction is committed to stable storage, that is, completed in the file server, and allows lost data transactions to be re-constructed or re-executed from the stored information. Mirroring, in turn, is often used in conjunction with caching or transaction logging and is essentially the storing of a copy of the contents of a cache or transaction log in, for example, the memory or stable storage space of a separate processor as the cache or transaction log entries are generated in the file processor.

Caching, transaction logging and mirroring, however, are often unsatisfactory because they are often costly in system resources and require complex administrative and synchronization operations and mechanisms to manage the caching, transaction logging and mirroring functions and subsequent transaction recovery operations, and significantly increase the file server latency, that is, the time required to complete a file transaction. It must also be noted that caching and transaction logging are vulnerable to failures in the processors in which the caching and logging mechanisms reside and that while mirroring is a solution to the problem of loss of the cache or transaction log contents, mirroring otherwise suffers from the same disadvantages as caching or transaction logging. These problems are compounded in that caching and, in particular, transaction logging and mirroring, require the storing of significant volumes of information while transaction logging and the re-construction or re-execution of logged file transactions requires the implementation and execution of complex algorithms to analyze, replay and roll back the transaction log to re-construct the file transactions. These problems are compounded still further in that these methods are typically implemented at the lower levels of file server functionality, where each data transaction is executed as a large number of detailed, complex file system operations. As a consequence, the volume of information to be extracted and stored and the number and complexity of operations required to extract and store the data or data transactions and to recover and reconstruct the data or data transactions operations is significantly increased.

Again, these methods are costly in system resources and require complex administrative and synchronization mechanisms to manage the methods and, because of the cost in system resources, the degree of redundancy that can be provided by these methods is limited, so that the systems often cannot deal with multiple sources of failure. For example, a system may provide duplicate parallel processor units or communications paths for certain functions, but the occurrence of failures in both processor units or communications paths will result in total loss of the system. In addition, these methods of the prior art for ensuring communications and data preservation and recovery typically operate in isolation from one another, and in separate levels or sub-systems. For this reason, the methods generally do not operate cooperatively or in combination, may operate in conflict with one another, and cannot deal with multiple failures or combinations of failures or failures requiring a combination of methods to overcome. Some systems of the prior art attempt to solve this problem, but this typically requires the use of a central, master coordination mechanism or sub-system and related complex administrative and synchronization mechanisms to achieve cooperative operation and to avoid conflict between the fault handling mechanisms, which is again costly in system resources and is in itself a source of failures.

The present invention provides a solution to these and other related problems of the prior art.

SUMMARY OF THE INVENTION

The present invention is directed to a high level transaction logging mechanism for use in a fault tolerant, low latency, shared system resource, such as a networked file server, and, in a preferred embodiment, a high level, cross server transaction mirror logging mechanism.

According to the present invention, a system resource includes a resource subsystem for performing low level system resource operations and a control/processing sub-system that includes a first blade processor. The first blade processor includes a first system processor performing high level system resource operations including transforming system resource requests from clients into corresponding low level system resource operations. A first transaction logging mechanism includes a first log generator for extracting high level system resource operation information relating to each system resource request directed to the first blade processor and a first transaction log for storing the high level system resource operation information. The first log generator is responsive to the restoration of operation of the system resource after a failure of system resource operations in the first blade processor for reading the high level system resource operation information relating to each system resource request directed to the first blade processor from the transaction log and restoring the state of execution of system resource requests directed to the first blade processor.

In the presently preferred embodiment, the high level system resource operation information relating to each system resource request directed to the first blade processor is extracted before the corresponding system resource is completed by the first system resource processor and a client system resource request is acknowledged as accepted by the system resource after the high level system resource operation information is stored in the first transaction log.

In further embodiments of the present invention, the first transaction logging mechanism further includes a first transaction log mirroring mechanism located separately from the first blade processor and communicating with the first log generator for receiving and storing mirror copies of the high level system resource operation information relating to each system resource request directed to the first blade processor. The first transaction log mirroring mechanism is responsive to the restoration of operation of the system resource after a failure of system resource operations in the first blade processor for reading the high level system resource operation information relating to each system resource request directed to the first blade processor from the first transaction log mirroring mechanism and restoring the state of execution of system resource requests directed to the first blade processor.

In still further preferred embodiments of the present invention, the control/processing sub-system further includes a second blade processor operating in parallel with the first blade processor that includes a second system resource processor performing high level system resource operations including transforming system resource requests from clients to the second blade processor into corresponding low level system resource operations and a second transaction logging mechanism. The second logging mechanism includes second log generator for extracting high level system resource operation information relating to each system resource request directed to the second blade processor and a second transaction log for storing the high level system resource operation information relating to each system resource request directed to the second blade processor. The second log generator is responsive to the restoration of operation of the system resource after a failure of system resource operations in the second blade processor for reading the high level system resource operation information from the transaction log and restoring the state of execution of system resources directed to the second blade processor and represented in the second transaction log. The preferred embodiment further includes a first transaction log mirroring mechanism residing in the second blade processor and communicating with the first log generator for receiving and storing copies of the high level system resource operation information relating to each system resource request directed to the first blade processor. The first transaction log mirroring mechanism is responsive to the restoration of operation of the system resource after a failure of system resource operations in the first blade processor for reading the high level system resource operation information relating to each system resource request directed to the first blade processor from the first transaction log mirroring mechanism and restoring the state of execution of system resources directed to the first blade processor. The first transaction logging mechanism, in turn, further includes a second transaction log mirroring mechanism residing in the first blade processor and communicating with the second log generator for receiving and storing copies of the high level system resource operation information relating to each system resource request directed to the second blade processor. The second transaction log mirroring mechanism is responsive to the restoration of operation of the system resource after a failure of system resource operations in the second blade mechanism for reading the high level system resource operation information relating to each system resource request directed to the second blade processor from the second transaction log mirroring mechanism and restoring the state of execution of system resource requests directed to the second blade processor.

DESCRIPTION OF THE DRAWINGS

The foregoing and other objects, features and advantages of the present invention will be apparent from the following description of the invention and embodiments thereof, as illustrated in the accompanying figures, wherein.

DESCRIPTION OF THE INVENTION

Figure 1:
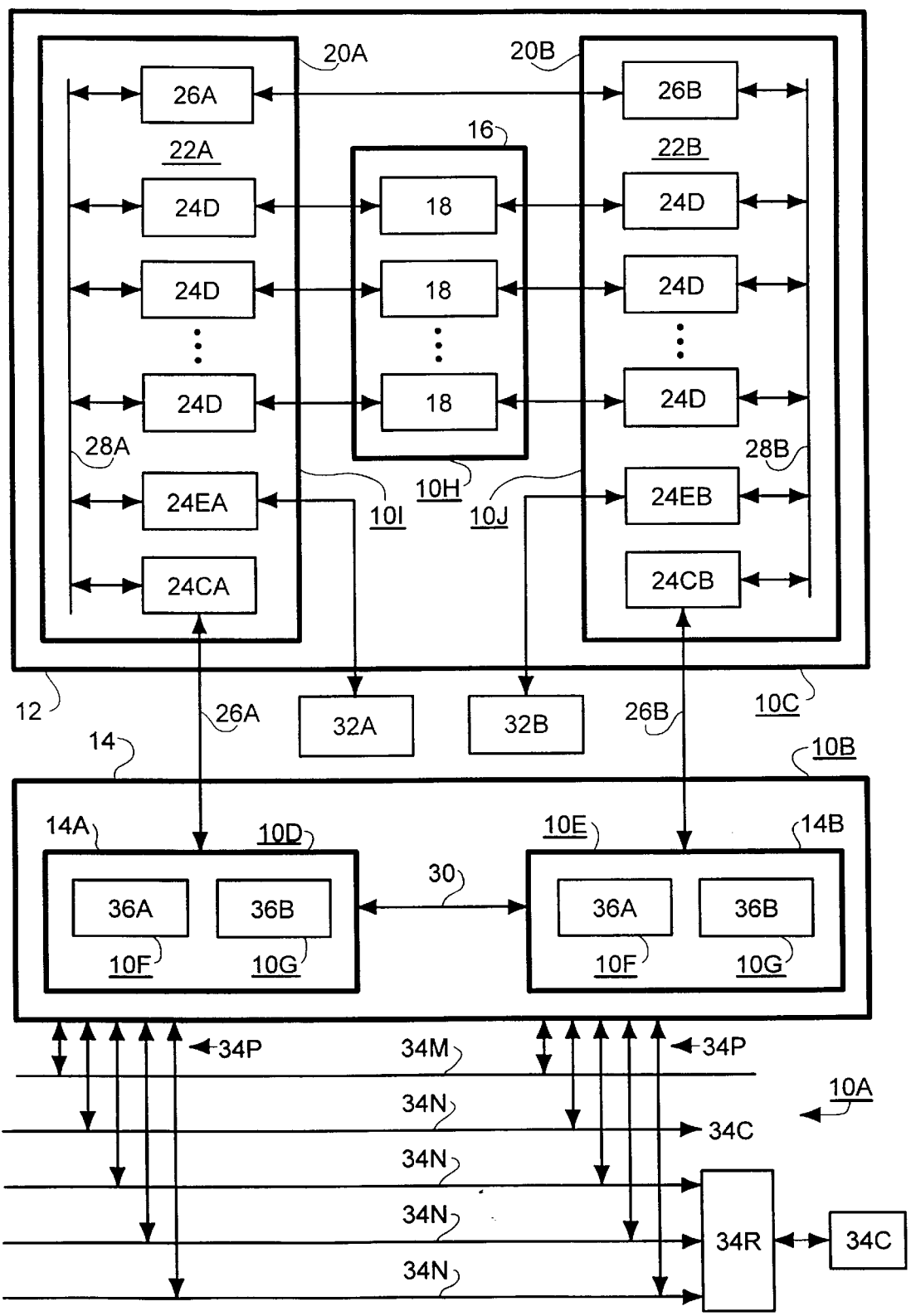
FIG. 1 is a block diagram of a networked file server in which the present invention may be implemented.

A. General Description of a High Availability Shared Resource (FIG. 1)

1. Introduction

As will be described in the following, the present invention is directed to a high availability resource, such as a file server, communications server, or print server, shared among a number of users in a networked system. A resource of the present invention is comprised of an integrated, cooperative cluster of hierarchical and peer domains wherein each domain performs or provides one or more related or functions integral to the functions or services supported by the resource and wherein a domain may be comprised of or include sub-domains. For example, one or more domains may provide communications services between the resource and networked clients, other domains may perform high level file system, communications or print functions, while other domains may perform lower level file system, communications and print functions. In the instance of hierarchically related domains, one domain may control another or may support a higher or lower level domain by performing related higher or lower level functions. For example, a higher level domain may perform high level file or communications function while a related lower level domain may perform lower level file or communications functions. Peer domains, in turn, may perform identical or parallel functions, for example, to increase the capacity of the resource with respect to certain functions by sharing the task load, or may perform related tasks or functions in mutual support to together comprise a domain. Yet other domains may be peer domains with respect to certain functions and hierarchically related domains with respect to other functions. Finally, and as will be described in the following discussions, certain domains will include fault handling mechanisms that operate separately and independently of fault handling mechanisms of other domains, but cooperatively to achieve a high level of resource availability.

The present invention may be implemented, for example and for purposes of the following descriptions, in a High Availability Networked File Server (HAN File Server) 10, and this implementation will be described in detail in the following discussions as an exemplary embodiment of the present invention. As illustrated in FIG. 1, a HAN File Server 10 in which the present invention is implemented may be, for example, a Data General Corporation CLARiiON™ File Server, providing highly available file system shares, that is, storage space, to networked clients with high integrity of data written to the shares through the use of a journaled file system, network failover capabilities, and back-end Redundant Array of Inexpensive Disks (RAID) storage of data. In a presently preferred implementation, a HAN File Server 10 supports both industry standard Common Internet File System Protocol (CIFS) and Network File System (NFS) shares, wherein the contrasting models for file access control as used by CIFS and NFS are implemented transparently. A HAN File Server 10 also integrates with existing industry standard administrative databases, such as Domain Controllers in a Microsoft Windows NT environment or Network File System (NFS) domains for Unix environments.

The presently preferred implementation provides high performance through use of a zero-copy IP protocol stack, by tightly integrating the file system caching methods with the back-end RAID mechanisms, and by utilizing a dual storage processor to provide availability of critical data by mirroring on the peer storage processor to avoid the requirement for writes to a storage disk. As will be described in detail in the following, a HAN File Server 10 of the presently preferred implementation operates in a dual processor, functional multiprocessing mode in which one processor operates as a front end processor to perform all network and file system operations for transferring data between the clients and the disk resident file system and supports a network stack, a CIFS/NFS implementation, and a journaled file system. The second processor operates as a block storage processor to perform all aspects of writing and reading data to and from a collection of disks managed in a highly available RAID configuration.

In the presently preferred implementation, the file system is implemented as a journaling, quick recovery file system with a kernel based CIFS network stack and supports NFS operations in a second mode, but modified according to the present invention to provide highly available access to the data in the file system. The file system further provides protection against the loss of a storage processor by preserving all data changes that network clients make to the file system by means of a data reflection feature wherein data changes stored in memory on one storage processor are preserved in the event of the hardware or software failure of that storage processor. The reflection of in-core data changes to the file system is achieved through an inter-storage processor communication system whereby data changes to the file system communicated by clients on one storage processor and using either NFS or CIFS are reflected and acknowledged as received by the other storage processor before an acknowledgment is returned to the network client storing the data. This insures that a copy of the data change is captured on the alternate storage processor in the event of failure on the original storage processor and, if and when failure occurs, the changes are applied to the file system after it has failed over to the alternate storage processor. As will be described, this reflection mechanism is built on top of underlying file system recovery mechanisms, which operate to recover and repair system metadata used to track files, while the reflection mechanism provides mechanisms to recover or repair user data. The block storage subsystem, in turn, provides protection at the disk level against the loss of a disk unit through the use of RAID technology. When a disk drive is lost, the RAID mechanism provides the mechanism to rebuild the data onto a replacement drive and provides access to the data when operating without the lost disk drive.

As will be described, a HAN File Server 10 of the presently preferred implementation provides high availability communications between clients of the server and the client file systems supported on the server through redundant components and data paths and communications failure handling mechanisms to maintain communications between clients and client file systems. A HAN File Server 10 of the present invention also includes file transaction and data backup and recovery systems to prevent the loss of file transactions and data and to permit the recovery or reconstruction of file transactions and data. In the event of a system hardware or software failure, the surviving components of the system will assume the tasks of the failed component. For example, the loss of a single Ethernet port on a storage processor will result in the network traffic from that port being assumed by another port on the alternate storage processor. In a like manner, the loss of any part of a storage processor that would compromise any aspect of its operations will result in the transfer of all network traffic and file systems to the surviving storage processor. In further example, the data and file transaction and backup mechanisms will permit the recovery and reconstruction of data and file transactions either by the failed component, when restored, or by a corresponding component and will permit a surviving component to assume the file transactions of a failed component. In addition, the loss of a single disk drive will not result in the loss of access to the data because the RAID mechanisms will utilize the surviving disks to provide access to the reconstructed data that had been residing on the lost drive. In the instance of power failures, which affect the entire file server, the file server state is preserved at the instant of the power failure and the in core data is committed to stable storage and restored when power is recovered, thereby preserving all data changes made before power was lost. Finally, the communications and data and file transaction failure recovery mechanisms of HAN File Server 10 are located in each domain or sub-system of the server and operate separately and independently of one another, but cooperatively to achieve a high level of availability of client to file system communications and to prevent loss and allow recovery of data and file transactions. The failure recovery mechanisms of a HAN File Server 10, however, avoid the complex mechanisms and procedures typically necessary to identify and isolate the source of a failure, and the complex mechanisms and operations typically necessary to coordinate, synchronize and manage potentially conflicting fault management operations.

2. Detailed Description of a HAN File Server 10 (FIG. 1)

Referring to FIG. 1, therein is shown a diagrammatic representation of an exemplary HAN File Server 10 in which the present invention may be implemented, such as a Data General Corporation CLARiiON™ File Server. As illustrated, a HAN File Server 10 includes a Storage Sub-System 12 and a Control/Processor Sub-System 14 comprised of dual Compute Blades (Blades) 14A and 14B that share Storage Sub-System 12. Compute Blades 14A and 14B operate independently to provide and support network access and file system functions to clients of the HAN File Server 10, and operate cooperatively to provide mutual back up and support for the network access and file system functions of each other.

a. Storage Sub-System 12 (FIG. 1)

Storage Sub-System 12 includes a Drive Bank 16 comprised of a plurality of hard Disk Drives 18, each of which is bi-directionally read/write accessed through dual Storage Loop Modules 20, which are indicated as Storage Loop Modules 20A and 20B. As illustrated, Storage Loop Modules 20A and 20B each include a Multiplexer Bank (MUXBANK) 22, indicated as MUXBANKs 22A and 22B, each of which includes a plurality of Multiplexers (MUXs) 24 and a Loop Controller 26, represented respectively as Loop Controllers 26A and 26B. The MUXs 24 and Loop Controller 26 of each Loop Controller Module 20 are bidirectionally interconnected through a MUX Loop Bus 28, represented as MUX Loop Buses 28A and 28B.

As illustrated, MUXBANKs 22A and 22B each include a Disk Drive MUX 24 (MUX 24D) corresponding to and connected to a corresponding one of Disk Drives 18, so that each Disk Drive 18 of Drive Bank 16 is bidirectionally read/write connected to a corresponding DMUX 24D in each of MUXBANKs 20A and 20B. Each of MUXBANKs 20A and 20B is further bidirectionally connected with the corresponding one of Compute Blades 14A and 14B through, respectively, MUX 24CA and MUX 24CB, and Compute Blades 14A and 14B are bidirectionally connected through Blade Bus 30. In addition, each of MUXBANKS 20A and 20B may include an External Disk Array MUX 24, represented as MUXs 24EA and 24EB, that is bidirectionally connected from the corresponding MUX Loop Bus 28A and 28B and bidirectionally connected to an External Disk Array (EDISKA) 32, respectively indicated as EDISKAs 32A and 32B, providing additional or alternate disk storage space.

Each of Disk Drives 18 therefore bidirectionally communicates with a MUX 24 of MUX Bank 22A and with a MUX 24 of MUX Bank 22B and the MUXs 24 of MUX Bank 20A are interconnected through a Loop Bus 26A while the MUXs 24 of MUX Bank 22B are interconnected through a Loop Bus 26B, so that each Disk Drive 18 is accessible through both Loop Bus 26A and Loop Bus 26B. In addition, Processor Blade 14A bidirectionally communicates with Loop Bus 26A while Processor Blade 14B bidirectionally communicates Loop Bus 26B and Processor Blades 14A and 14B are directly interconnected and communicate through Blade Loop (Blade) Bus 30. As such, Processor Blades 14A and 14B may bidirectionally communicate with any of Disk Drives 18, either directly through their associated Loop Bus 26 or indirectly through the other of Processor Blades 14, and may communicate directly with each other.

Lastly with respect to Storage Sub-System 12, in the presently preferred embodiment of a HAN Filer Server 10, and for example, each Disk Drive 18 is a hotswap fiber channel disk drive encased in a carrier for easy user replacement and the drives and carriers plug into a midplane, which distributes power and contains MUX Loop Buses 26A and 26B, thereby interconnecting each dual ported drive to MUXs 24 and MUXs 24 with Loop Controllers 26. MUXs 24 are fiber channel MUX devices and Loop Controllers 26 include micro-controllers to control the path selection of each MUX device to selectively connect each Disk Drive 18's dual ports in or out of the fiber channel MUX Loop Buses 26A and 26B. MUXs 24CA and 24CB and MUXs 24EA and 24E are similarly fiber channel MUX devices and connect Storage Sub-System 12 to Compute Blades 14A and 14B and EDISKAs 32A and 32B through fiber channel loop buses, while Compute Blade Bus 30 is likewise a fiber channel bus.

b. Control/Processor Sub-System 14 (FIGS. 1 and 2)

As described above, Control/Processor Sub-System 14 is comprised of dual Compute Blades (Blades) 14A and 14B interconnected through Compute Blade Bus 30, which together comprise a computational and control sub-system that controls the operations of shared Storage Sub-System 12. Compute Blades 14A and 14B operate independently to provide and support network access and file system functions to clients of the HAN File Server 10, and operate cooperatively to provide mutual back-up and support for the Network 34 access and file system functions of each other. As illustrated in FIGS. 1 and 2, each Blade 14 includes a number of Network Ports (Ports) 34P connected to Networks 34, which comprise the bidirectional data communications connections between the HAN File Server 10 and Clients 34C using the HAN File Server 10. As illustrated, the networks may include, for example, a plurality of Client Networks 34N connecting to Clients 34C and a Management Network 34M and may include a Router 34R connecting to remote Clients 34C. As will be understood by those of ordinary skill in the relevant arts, Networks 34 may be comprised, for example, of local area networks (LANs), wide area networks (WANs), direct processor connections or buses, fiber optic links, or any combination thereof.

Figure 2:
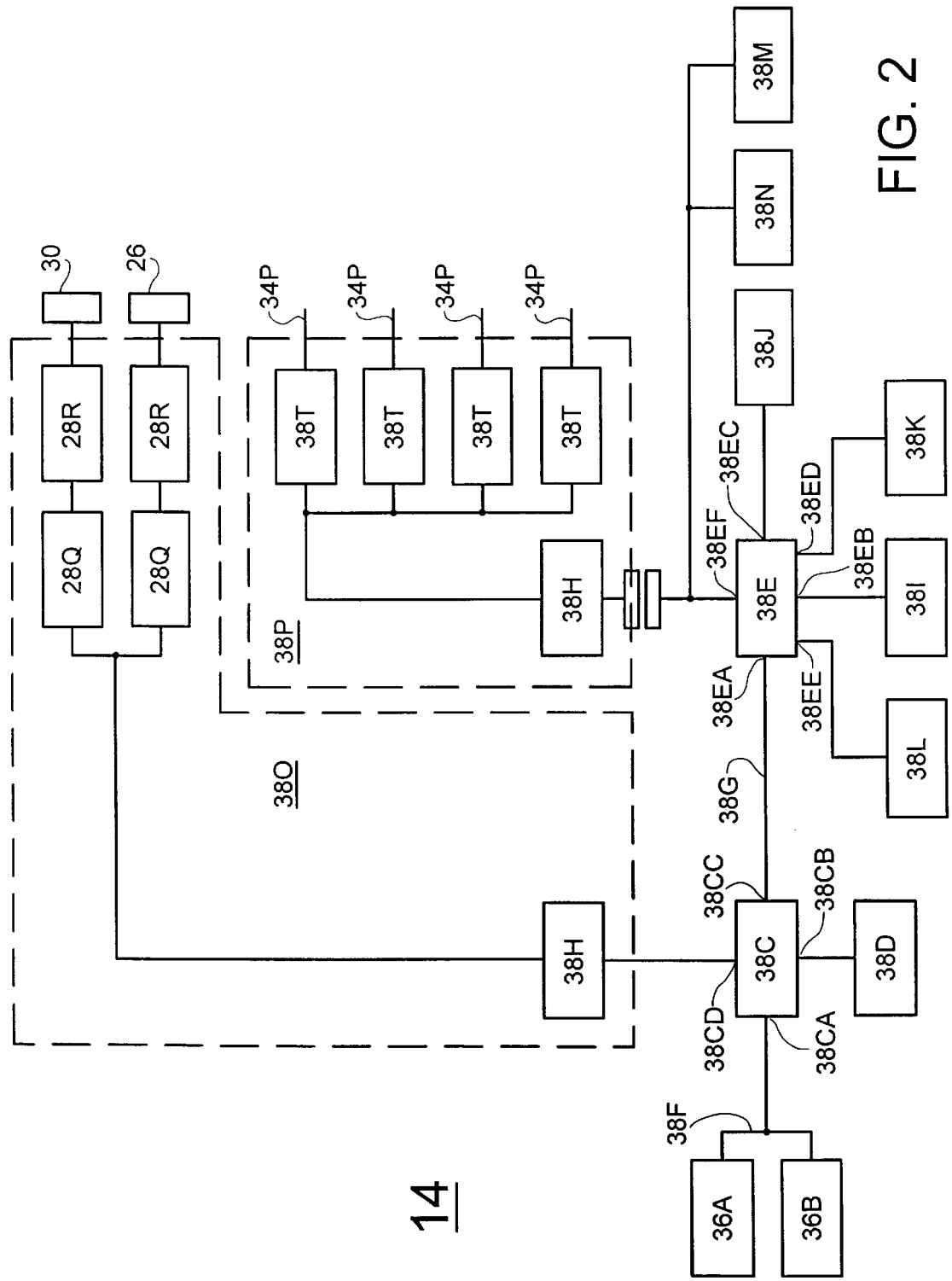
FIG. 2 is a block diagram of a processor core of a domain of the file server of FIG. 1.

As indicated in FIG. 2, each of Blades 14 is comprised of dual Processing Units 36A and 36B which share coherent access to memory and other elements, such as communications components. Each of Processing Units 36A and 36B is a fully functional computational processing unit executing a full operating system kernel and cooperate in a functional multi-processing structure. For example, and in the presently preferred implementation as will be described further in the following descriptions, one of Processing Units 36 performs RAID functions while the other Processing Unit 36 performs network functions, protocol stack functions, CIFS and NFS functions, and file system functions.

c. General Architecture of a HAN File Server 10 and HAN File Server 10 Fault Handling Mechanisms (FIGS. 1 and 2)

As described, therefore, a HAN File Server 10 of the present invention is comprised of a cluster of hierarchical and peer domains, that is, nodes or sub-systems, wherein each domain performs one or more tasks or functions of the file server and includes fault handling mechanisms. For example, the HAN File Server 10 is comprised of three hierarchical Domains 10A, 10 and 10C comprising, respectively, Networks 34N, Control/Processor Sub-System 14 and Storage Sub-System 12, which perform separate and complementary functions of the file server. That is, Domain 10A provides client/server communications between Clients 34 and the HAN File Server 10, Domain 10B, that is, Control/Processor Sub-System 14, supports the client/server communications of Domain 10A and supports high level file system transactions, and Domain 10C, that is, Storage Sub-System 12, supports the file systems of the clients. Control/Processor Sub-System 14, in turn, is comprised of two peer Domains 10D and 10E, that is, Blades 14A and 14B, which perform parallel functions, in particular client/server communications functions and higher and lower level file system operations, thereby sharing the client communications and file operations task loads. As will be described in detail in following descriptions, the domains comprising Blades 14A and 14B also include independently functioning fault handling mechanisms providing fault handling and support for client/server communications, inter-Blade 14 communications, high level file system functions, and low level file system functions executed in Storage Sub-System 12. Each Blade 14, in turn, is a domain comprised of two hierarchical Domains 10F and 10G, based on Processing Units 36A and 36B, that perform separate but complementary functions that together comprise the functions of Blades 14A and 14B. As will be described, one or Processing Units 36 forms upper Domain 10F providing high level file operations and client/server communications with fault handling mechanisms for both functions. The other of Processing Units 36 forms lower Domain 10G providing lower level file operations and inter-Blade 14 communications, with independently operating fault handling mechanisms operating in support of both functions and of the server functions and fault handling mechanisms of the upper Domain 10F. Finally, Storage Sub-System 12 is similarly comprised of a lower Domain 10H, which comprises Disk Drives 18, that is, the storage elements of the server, and indirectly supports the RAID mechanisms supported by Domains 10E of Blades 14, and peer upper Domains 101 and 10J, which include Storage Loop Modules 20A and 20B which support communications between Domains 10D and 10E and Domain 10H.

Therefore, and as will be described in the following, each HAN File Server 10 domain directly or indirectly contains or includes one or more fault handling mechanisms that operate independently and separately from one another but cooperatively with one another, without a single, central master or coordinating mechanism, so that the functions or operations of a failed component of one domain will be assumed by a corresponding component of a related domain. In addition, and as will also be described in the following, certain of the fault handling mechanisms of a HAN File Server 10 employ multiple different technologies or methods transparently to provide continued functionality in the event of a single or multiple failures.

Having described the overall structure and operation of a HAN File Server 10, the following will describe each domain of a HAN File Server 10 in further detail, and the structure and operation of the HAN File Server 10 fault handling mechanisms.

1. Processing and Control Core of a Blade 14

Referring to FIG. 2, therein is illustrated a presently preferred implementation of a Blade 14 wherein it is shown that a Blade 14 includes dual Processors 38A and 38B, which respectively form the computational cores of dual Processing Units 36A and 36B, and a number of shared elements, such as Memory Controller Hub (MCH) 38C, Memory 38D, and an Input/Output Controller Hub (ICH) 38E. In a present implementation, for example, each of Processors 38A and 38B is an Intel Pentium-III Processor with an internal Level 2 cache, MCH 38C and ICH 38E is an Intel 820 chipset and Memory 38D is comprised of 512 MB of RDRAM or SDRAM, but may be larger.

As shown, Processors 38A and 38B are interconnected with MCH 38C through a pipelined Front Side Bus (FSB) 38F and a corresponding FSB Port 38Ca of MCH 38C. As will be well understood by those of ordinary skill in the arts, MCH 38C and MCH 39C's FSB port support the initiation and reception of memory references from Processors 38A and 38B, the initiation and reception of input/output (I/O) and memory mapped I/O requests from Processors 38A and 38B, the delivery of memory data to Processors 38A and 38B from Memory 38C, and the initiation of memory snoop cycles resulting from memory I/O requests. As also shown, MCH 38C further includes a Memory Port 38Cb to Memory 38D, a Hublink Port 38Cc connecting to a Hublink Bus 38G to ICH 38E and four AGP Ports 38Cd functioning as industry standard Personal Computer Interconnect (PCI) buses, each of which is connected to a Processor to Processor Bridge Unit (P-P Bridge) 38H, such as an Intel 21154 chip.

ICH 38E, in turn, includes a Hublink Port 38Ea connecting to Hublink Bus 38G to MCH 38C, a Firmware Port 38Eb connecting to a Firmware Memory 38I, a Monitor Port 38Ec connecting to a Hardware Monitor (HM) 38J, and an IDE Drive Port 38Ed connecting to a Boot Drive 38K, an I/O Port 38Ee connecting to a Super I/O Device (Super I/O) 38L, and a PCI Port 38Ef connecting to, among other elements, a VGA Device (VGA) 38M and a Management Local Area Network Device (LAN) 38N, all of which will be well understood by those of ordinary skill in the arts.

2. Personal Computer Compatibility Sub-System of a Blade 14

ICH 38E, Super I/O 38L and VGA 38M together comprise a Personal Computer (PC) compatibility subsystem providing PC functions and services for the HAN File Server 10 for purposes of local control and display functions. For these purposes, ICH 38E, as will be understood by those of ordinary skill in the arts, provides IDE controller functions, an IO APIC, 82C59 based timers and a real time clock. Super IO 38L, in turn, may be, for example, a Standard Microsystems Device LPC47B27x and provides an 8042 keyboard/mouse controller, a 2.88 MB super 10 floppy disk controller and dual full function serial ports while VGA 38M may be, for example, a Cirrus Logic 64-bit VisualMedia® Accelerator CL-GD5446-QC supporting a 1 MB frame buffer memory.

3. Firmware and BIOS Sub-System of a Blade 14

ICH 38E and Firmware Memory 38I together comprise a firmware and BIOS subsystem executing the customary firmware and BIOS functions, including power-on self-test (POST) and full configuration of Blade 14A and 14B resources. The firmware and BIOS, which is, for example, a standard BIOS as is available from AMI/Phoenix, reside in Firmware Memory 38I, which includes 1 MB of Flash memory. After the POST completes, the BIOS will scan for the PCI buses, described above, and during this scan will configure the two PCI-to-PCI bridges, described above and in the following descriptions, and will detect the presence of, and map in the PCI address space, the fiber channel and LAN controllers on the back-end and front-end PCI buses described in a following discussion. This information is noted in MP compliant tables that describe the topology of the IO subsystem along with the other standard sizing information, such as PC compatibility IO, memory size, and so on, and POST performs a simple path check and memory diagnostic. After POST completes, a flash resident user binary code segment is loaded which contains an in-depth pre-boot diagnostic package, which also initializes the fiber channel devices and checks the integrity of the components on the compute blade by exercising data paths and DRAM cells with pattern sensitive data. After the diagnostics are run, control is either turned back over to the BIOS or to a bootstrap utility. If control is turned over to the BIOS the system will continue to boot and, if control is turned over to the bootstrap utility, the boot block is read from the fibre disk and control is then passed to the newly loaded operating system's image. In addition, this sub-system provides features and functions in support of the overall system management architecture, including error checking logic, environmental monitoring and error and threshold logging. At the lowest level, hardware error and environmental threshold checks are performed that include internal processor cache parity/ECC errors, PCI bus parity errors, RDRAM ECC errors and front-side bus ECC errors. Errors and exceeded environmental threshold events are logged into a portion of the Flash prom in a DMI compliant record format.

4. I/O Bus Sub-Systems of a Blade 14

Lastly, MCH 38C and ICH 38E support two Blade 14 input/output (I/O) bus sub-systems, the first being a Back-End Bus Sub-System (BE BusSys) 38O supported by MCH 38C and providing the previously described bi-directional connections between the Blade 14 and the corresponding Loop Bus 26 of Storage Sub-System 12 and the bi-directional connection between Blades 14A and 14B through Compute Blade Bus 30. The second is a Front-End Bus Sub-System (FE BusSys) 38P supported by ICH 38E which provides the previously described bi-directional connections to and from Networks 34 wherein Networks 34, as discussed previously, may be comprised, for example, of local area networks (LANs), wide area networks (WANs), direct processor connections or buses, fiber optic links, or any combination thereof.

First considering BE BusSys 38O, as described above MCH 38C supports four AGP Ports 38Cd functioning as industry standard Personal Computer Interconnect (PCI) buses. Each AGP Port 38Cd is connected to a Processor to Processor Bridge Unit (P-P Bridge) 38H, such as an Intel 21154 chip, which in turn is connected to the bi-directional bus ports of two Fiber Channel Controllers (FCCs) 38Q, which may be comprised, for example, of Tach Lite fiber channel controllers. The parallel fiber channel interfaces of the FCCs 38Q are in turn connected to the parallel fiber channel interfaces of two corresponding Serializer/Deserializer Devices (SER-DES) 38R. The serial interface of one SER-DES 38R is connected to Compute Blade Bus 30 to provide the communications connection to the other of the dual Blades 14, while the serial interface of the other SER-DES 38R is connected to the corresponding Loop Bus 26 of Storage Sub-System 12.

In FE BusSys 38P, and as described above, ICH 38E includes a PCI Port 38Ef and, as shown, PCI Port 38Ef is bidirectionally to a PCI Bus to PCI Bus Bridge Unit (P-P Bridge) 38S which may be comprised, for example, of an Intel 21152 supporting a bidirectional 32 bit 33 MHz Front-End PCI bus segment. The Front-End PCI bus segment, in turn, is connected to a set of bidirectional Network Devices (NETDEVs) 38T connecting to Networks 34 and which may be, for example, Intel 82559 10/100 Ethernet controller devices. It will be understood, as described previously, that Networks 34 may be may be comprised, for example, of local area networks (LANs), wide area networks (WANs), direct processor connections or buses, fiber optic links, or any combination thereof, and that NETDEVs 38T will be selected accordingly.

Lastly with respect to BE BusSys 38O and FE BusSys 38P, it should be noted that both BE BusSys 38O and FE BusSys 38P are PCI type buses in the presently preferred embodiment and, as such, have a common interrupt structure. For this reason, the PCI interrupts of BE BusSys 38O and FE BusSys 38P are routed such that the PCI bus devices of BE BusSys 38O do not share any interrupts with the PCI bus devices of FE BusSys 38P.

c. Operation of a HAN File Server 10 (FIGS. 1, 2, 3 and 4)

1. General Operation of a HAN File System 10

Figure 3:
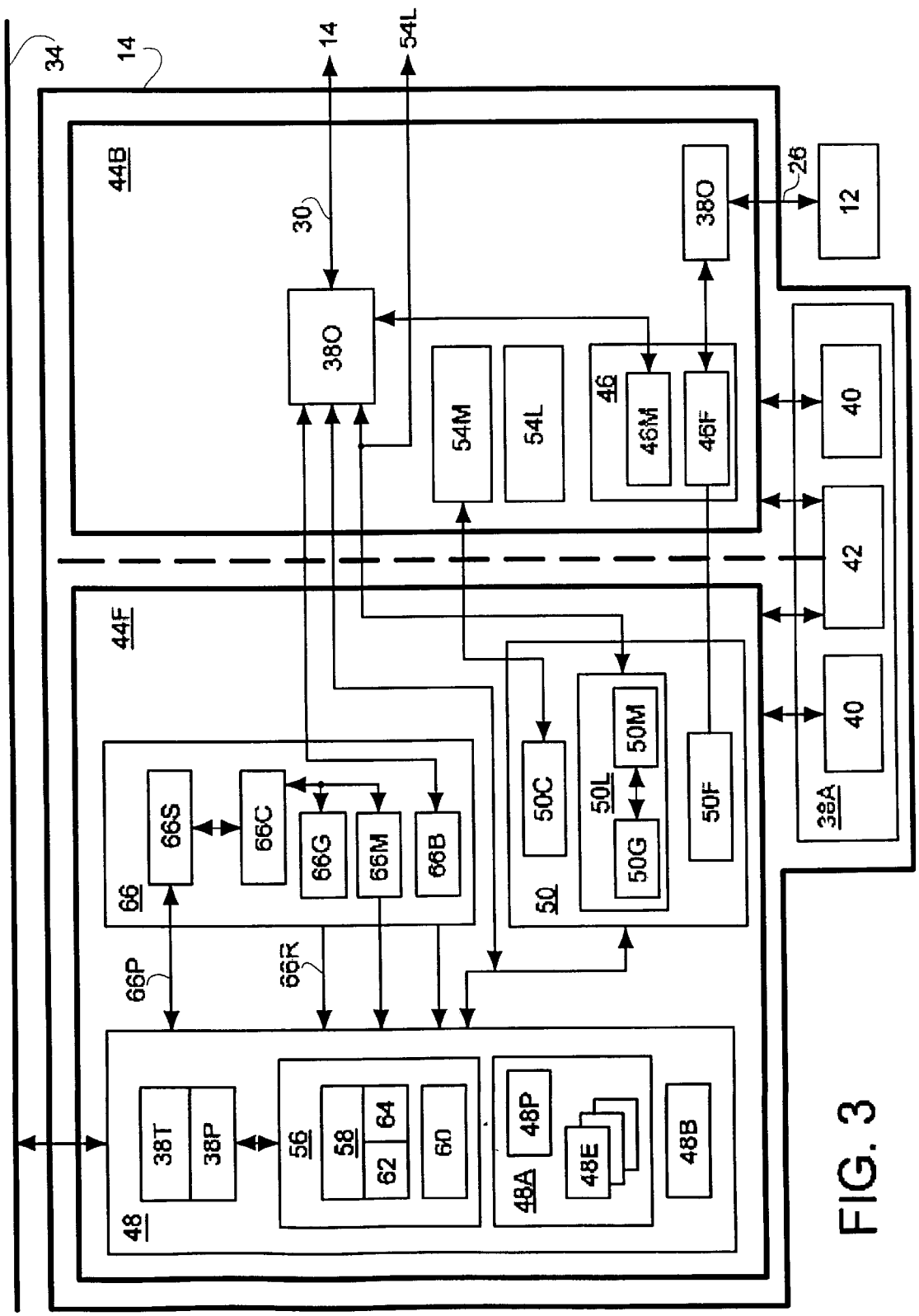
FIG. 3 is a diagrammatic illustration of a domain of the file server of FIG. 1 in further detail.

As described previously, a HAN File System 10 includes dual Compute Blades 14, each of which has complete access to all Disk Drives 18 of the Storage Sub-System 12 and connections to all Client Networks 34N and each of which is independently capable of performing all functions and operations of the HAN File System 10. A diagrammatic representation of the functional and operational structure of a Blade 14 is illustrated in FIG. 3. FIG. 3 shows a single one of Blades 14A and 14B and it will be understood that the other of Blades 14 is identical to and a mirror image of the Blade 14 illustrated.

Within a Blade 14, and as described above, the dual Processing Units 36A and 36B share a number of Blade 14 elements, such as Memory Controller Hub (MCH) 38C, Memory 38D, and an Input/Output Controller Hub (ICH) 38E. Each of Processing Units 36A and 36B operates independently but cooperatively of the other, with each executing a separate copy of a real time Operating System (OS) 40 residing in Memory 38A wherein each copy of the OS 40 provides, for example, basic memory management, task scheduling and synchronization functions and other basic operating system functions for the corresponding one of Processing Units 36A and 36B. Processing Units 36A and 36B communicate through a Message Passing Mechanism (Message) 42 implemented in shared Memory 38A wherein messages are defined, for example, for starting an I/O, for I/O completion, for event notification, such as a disk failure, for status queries, and for mirroring of critical data structures, such as the file system journal, which is mirrored through Blade Bus 30. At initialization, each Blade 14 loads both copies of OS 40 and the RAID, file system and networking images from the back end Disk Drives 18. The two RAID kernels, each executing in one of Processing Units 36A and 36B, then cooperatively partition the Memory 38A of the Blade 14 between the two instances of OS 40, and initiates operations of Processing Units 36A and 36B after the copies of the OS 40 kernel are loaded. After initialization, the OS 40 kernels communicate through Message 42.

As illustrated in FIG. 3, within each Blade 14 one of Processing Units 36A and 36B is designated as and operates as a Back-End Processor (BEP) 44B and, as described above, operates as a block storage system for writing and reading data to and from RAID configuration disks and includes a RAID Mechanism (RAID) 46 that includes a RAID File Mechanism (RAIDF) 46F that performs RAID data storage and backup functions and a RAID Monitor Mechanism (RAIDM) 46M that performs RAID related system monitoring functions, as well as other functions described below. The other of Processing Units 36A and 36B is designated as and operates as a Front-End Processor (FEP) 44F and performs all network and file system operations for transferring data between the clients and the disk resident block storage system and associated RAID functions of the BEP 44B, including supporting the network drivers, protocol stacks, including CIFS and NFS protocols, and maintaining a journaled file system.

In addition to block storage system operations, the functions of BEP 44B include executing core RAID file system support algorithms through RAIDF 46F and, through RAIDM 46M, monitoring the operation of Disk Drives 18, monitoring the operations and state of both the Blade 14 in which it resides and the peer Blade 14, and reporting failures to the administrative functions. As described above with respect to FIG. 2 and BE BusSys 38O, BEP 44B also supports communications between Blades 14A and 14B through BE BusSys 38O and Blade Bus 30 and with Disk Drives 18 through BE BusSys 38O and the corresponding Loop Bus 26 of Storage Sub-System 12. RAIDM 46M also monitors the Blade 14 power supplies and executes appropriate actions on the event of a power failure, such as performing an emergency write of critical data structures to Disk Drives 18 and notifying the other of Processing Units 36A and 36B so that the other of Processing Units 36A and 36B may initiate appropriate action. The BEP 44B further provides certain bootstrap support functions whereby runtime kernels can be stored on Disk Drives 18 and loaded at system boot.

FEP 44F, in turn, includes Network Mechanisms (Network) 48 which performs all Network 34 related functions and operations of the Blade 14 and includes the elements of FE BusSys 30P and NetDevs 38T. For example, Network 48 manages and provides the resources available to network clients, including FE BusSys 38P, to provide access to the HAN File System 10 to Clients 34C through Networks 34. As will be described, Network 48 also supports communications failover mechanisms resident in the FEP 44F and other high availability features as described herein.

FEP 44F also includes a Journaled File System (JFile) 50, which communicates with clients of HAN File Server 10 through Network 48 and with the RAID file system functions of RAIDF 46F through Message 42. As indicated, JFile 50 includes a File System Mechanism (FSM) 5OF that executes the file system functions of JFile 50 and an Internal Write Cache (WCache) 50C and a Transaction Log (Log) 50L that interoperate with FSM 5OF to respectively cache the data and operations of data transactions and to maintain a journal of data transactions. Log 50L, in turn, that includes a Log Generator (LGen) 5OG for generating Log Entries (SEs) 50E representing requested data transactions and a Log Memory (LogM) 50M for storing SEs 50E, the depth of LogM 50M depending upon the number of data transactions to be journaled, as which will be discussed further below. As indicated, BEP 44B includes a Cache Mirror Mechanism (CMirror) 54C that communicates with WCache 50C and mirrors the contents of WCache 50C. In addition, the Log 50L of each Blade 14 is mirrored by a Log 50L Mirror Mechanism (LMirror) 54L residing in the opposite, peer Blade 14 wherein the Log 50L of each Blade 14 communicates with the corresponding LMirror 54L through the path comprising Message 42, BE BusSys 38O and Blade Bus 30.

Finally, FEP 44F includes a Status Monitor Mechanism (Monitor) 52, which monitors notifications from BEP 44B regarding changes in the HAN File System 10 and initiates appropriate actions in response to such changes. These notification may include, for example, notifications from RAIDM 46M regarding the binding of newly inserted disks into a RAID group or raising an SNMP trap for a failed disk, and the operations initiated by Monitor 52 may include, for example, initiating a failover operation or complete Blade 14 shutdown by the failure handling mechanisms of the HAN File Server 10, as will be described in the following, if the RAID functions encounter a sufficiently serious error, and so on.

2. Operation of the File System Mechanisms of a HAN File Server 10 (FIGS. 1, 2 and 3)

As described herein above and as illustrated in FIG. 3, the file server mechanisms of a HAN File Server 10 include three primary components or layers, the first and uppermost layer being the file system mechanisms of JFile 50 with WCache 50C and Log 50L residing on the Front-End Processors 44F of each of Blades 14A and 14B. The lowest layer includes Storage Sub-System 12 with Disk Drives 18 and the block storage system functions and RAIDF 46F functions residing on the BEPs 44B of each of Blades 14A and 14B. The third layer or component of the HAN File Server 10 file system mechanisms is comprised of the fault handing mechanisms for detecting and handling faults affecting the operation of the file system mechanisms and for recovery from file system failures. The structure and operation of the upper and lower file system elements have been discussed and described above and are similar to those well known and understood by those of ordinary skill in the relevant arts. As such, these elements of the exemplary HAN File Server 10 file mechanisms will not be discussed in detail herein except as necessary for a complete understanding of the present invention. The following discussions will instead focus on the fault handling mechanisms of the HAN Filer Server 10 file mechanisms and, in particular, on the fault handling mechanisms related to operation of the upper level file system elements of the HAN File Server 10.

As described, the third component of the HAN File Server 10 file mechanisms is comprised of mirroring mechanisms that provide protection against the loss of data resulting from the loss of any HAN File Server 10 component. As illustrated in FIG. 3, the mirroring mechanisms include, for each Blade 14, a Cache Mirror Mechanism (CMirror) 54C residing in the BEP 44B of the Blade 14 and a Log Mirror Mechanism (LMirror) 54L residing in the BEP 40B of the opposite, peer Blade 14. CMirror 54M is a continuous operating cache mirroring mechanism communicating with WCache 50C of JFile 50 through Message 42. Log 50L, in turn, is mirrored on demand by the LMirror 54L residing in the BEP 44B of the peer Blade 14, communicating with the corresponding LogM 50M through the path including Message 42, BE BusSys 38O and Compute Blade Bus 30, so that all data changes to the file systems through one of Blades 14A or 14B are reflected to the other of Blades 14A and 14B before being acknowledged to the client. In this regard, and in the presently preferred embodiment, the mirroring of a Log 50L is performed during the processing of each file system transaction, so that the latency of the transaction log mirroring is masked to the extent possible by the execution of the actual file system transaction. Lastly, it will be understood that the Disk Drive 18 file system, control, monitoring and data recovery/reconstruction functions supported and provided by RAIDF 46F are additionally a part of the HAN File Server 10 data protection mechanisms, using data mirroring methods internal to Storage Sub-System 12.

As will be described further in following discussions, these mirroring mechanisms therefore support a number of alternative methods for dealing with a failure in a Blade 14, depending upon the type of failure. For example, in the event of a failure of one Blade 14 the surviving Blade 14 may read the stored file transactions stored in its LMirror 54L back to the failed Blade 14 when the failed Blade 14 is restored to operation, whereupon any lost file transactions may be re-executed and restored by the restored Blade 14. In other methods, and as will be described further with regard to Network 34 fail-over mechanisms of the Blades 14, file transactions directed to the failed Blade 14 may be redirected to the surviving Blade 14 through the either the Blade Bus 30 path between the Blades 14 or by redirection of the clients to the surviving Blade 14 by means of the Network 34 fail-over mechanisms of the Blades 14. The surviving Blade 14 will thereby assume execution of file transactions directed to the failed Blade 14. As described below, the surviving Blade 14 may, as part of this operation, either re-execute and recover any lost file transactions of the failed Blade 14 by re-executing the file transactions from the failed Blade 14 that are stored in its LMirror 54L, or may read the file transactions back to the failed Blade 14 after the failed Blade 14 is restored to operation, thereby recreating the state of the file system on the failed Blade 14 at the time of the failure so that no data is lost from the failed Blade 14 for acknowledged transactions.

3. Operation of the Communications Mechanisms of a HAN File Server 10 (FIGS. 1, 2, and 3)

As illustrated in FIGS. 1, 2 and 3, the communications mechanisms of a HAN File Server 10 incorporating the present invention may be regarded as comprised of three levels or layers of communications mechanisms. For purposes of the present descriptions, the uppermost level is comprised of Network 34 related communications mechanisms for communication of file transactions between Clients 34C arid the client file system structures supported by the HAN File Server 10 and the related communications failure handling mechanisms. The middle layer of communications mechanisms includes communications mechanisms supporting communications between Blades 14A and 14B, such Blade Bus 30 and Messages 42, and the related communications failure handling mechanisms. The lowest layer of communications mechanisms includes the paths and mechanisms for communication between Blades 14 and Storage Sub-System 12 and between the elements of Storage Sub-System 12, which have been discussed above and will not be discussed further except as necessary for an understanding of the present invention.

First considering the upper level or layer of communications mechanisms of a HAN File Server 10, as illustrated in FIG. 3, the Network Mechanisms (Network) 48 residing on the FEP 44F of each of Blades 14A and 14B include a Network Stack Operating System (NetSOS) 56 that includes a TCP/IP Protocol Stack (TCP/IP Stack) 58, and Network Device Drivers (NetDDs) 60 wherein, as described below, these mechanisms are enhanced to accommodate and deal with single Port 34P failures, Network 34 failures and entire Blade 14 failures. In this regard, and as discussed elsewhere herein, Networks 34 may be comprised, for example, of local area networks (LANs), wide area networks (WANs), direct processor connections or buses, fiber optic links, or any combination thereof, and NETDEVs 38T and NetDDs 60 will be implemented accordingly.

As also shown in FIG. 3, and discussed further below with respect to the high availability communications mechanisms of a HAN File Server 10, each Network 48 further includes a Client Routing Table (CRT) 48A for storing Client Routing Entries (CREs) 48E containing routing and address information pertaining to the Clients 34C supported by the Blade 14 and CREs 48E of Clients 34C supported by the opposite, peer Blade 14. As will be understood by those of ordinary skill in the relevant arts, CREs 48E may be used by Network 48 to direct file transaction communications to a given Client 34C and, if necessary, to identify or confirm file transaction communications received from those Clients 34C assigned to a Blade 14. As indicated, each Network 48 will also include a Blade Routing Table (BRT) 48B containing address and routing information relating to the Network 34 communications paths accessible to and shared by Blades 14 and thereby forming potential communications paths between Blades 14. In a typical and presently preferred implementation of Networks 48, CRT 48A and BRT 48B information is communicated between Blades 14A and 14B through the communication path including Blade Bus 30, but may be provided to each Blade 14 through, for example, Network 34M.

First considering the general operation of the Network 34 communications mechanisms of a HAN File Server 10 and referring to FIGS. 1 and 2, each Blade 14 of a HAN File Server 10 supports a plurality of Ports 34P connecting to and communicating with Networks 34. For example, in a present implementation each Blade 14 supports a total of five Ports 34P wherein four Ports 34P are connected to Networks 34N to service Clients 34C and one port is reserved for management of the HAN File Server 10 and is connected to a management Network 34M. As illustrated, corresponding Ports 34P on each of Blades 14A and 14B are connected to the same Networks 34, so that each Network 34 is provided with a connection, through matching Ports 34P, to each of Blades 14A and 14B. In the present example, the Ports 34P of the HAN File Server 10 are configured with 10 different IP addresses, that is, one address for each port, with the Ports 34P of each corresponding pair of Ports 34P of the Blades 14 being attached to the same Network 34, so that each Network 34 may address the HAN File Server 10 through two addresses, one to each of Blades 14A and 14B. The Ports 34P to which each client of a HAN File Server 10 are assigned are determined within each client, by an ARP table residing in the client, as is conventional in the art and as will be well understood by those of ordinary skill in the relevant arts. In addition and as also represented in FIG. 2, Clients 34C can access the HAN File Server 10 either through one of the directly connected Network 34 connections or through the optional Router 34R if the HAN File Server 10 is configured with a default route or is provided with a routing protocol such as RIP or OSP. In alternate implementations of a HAN File Server 10, each Client 34C may be connected to Ports 34P of the HAN File Server 10 through multiple Networks 34, and the Networks 34 may utilize different technologies, such as local area networks (LANs), wide area networks (WANs), direct processor connections or buses, fiber optic links, or any combination thereof, with appropriate adaptations of the ARP tables of Clients 34C and the HAN File Server 10, which are described further below.

As represented in FIG. 3, the Network 48 mechanisms residing on each FEP 44F of each of Blades 14A and 14B further include CIFS 62 and NFS 64 network file systems, and other necessary services. These additional services, which are not shown explicitly in FIG. 3, include:

NETBIOS—a Microsoft/IBM/Intel protocol used by PC clients to access remote resources. One of the key features of this protocol is to resolve server names into transport addresses wherein a server is a component of a UNC name which is used by the client to identify the share, that is, a \\server\share, wherein in the HAN File Server 10 the server represents the a Blade 14A or 14B. NETBIOS also provides CIFS 62 packet framing, and the HAN File Server 10 uses NETBIOS over TCP/IP as defined in RFC 1001 and RFC 1002;

SNMP—the Simple Network Management Protocol, that provides the HAN File Server 10 with a process, called the agent, that provides information about the system and provides the ability to send traps when interesting events occur;

SMTP—the Simple Mail Transport Protocol used by the HAN File Server 10 to send email messages when interesting events occur;

NFS—the Sun Microsystems Network Information Service that provides a protocol used by NFS servers to identify the user ID's used to control access to NFS file systems; and, RIP—a dynamic routing protocol that may be used to discover networking topology in support of clients that are running behind a router such as Router 34R. In the present implementation of a HAN File Server 10 this protocol operates in the passive mode to monitor routing information. In alternate implementations, the user may install or designate a default route during system initialization.

For purposes of description of the present invention, it will be understood by those of ordinary skill in the relevant arts that in normal operation of a HAN File Server 10 the elements of each Network 48, that is, NetSOS 56, TCP/IP Stack 58, NetDDs 60 and CRT 48A, operate in the conventional manner well understood by those of ordinary skill in the arts to perform network communications operations between Clients 34C and the HAN File Server 10. As such, these aspects of HAN File Server 10 and a Network 48 will not be discussed in further detail and the following discussions will focus on the high availability network related communications mechanisms of a HAN File Server 10.

4. HAN File Server 10 Communications Fault Handling Mechanisms (FIGS. 1, 2 and 3)

a. Network Communications Failure Mechanisms

It will be recognized and understood by those of ordinary skill in the relevant arts that while a communications or connectivity failure is readily detected, the determination of what component has failed, and thus the appropriate corrective measures, are difficult and complex. For example, possible sources of failure include, but are not limited to, a failed Port 34P, a failed link between a Port 34P and a hub or switch of the Network 34, or a failed or erroneous partition in the network between the Blades 14. A HAN File Server 10, however, provides IP network communications services capable of dealing with failures of one or more Network 34 interfaces and different types of Network 34 failures, as well as Blade 14 failures and, in order to provide the server system with the capability of degrading incrementally for various failures, implements a number of cooperative or complementary mechanisms to deal with the different classes or types of failure. For example, in the instance of a Port 34P interface failure in a Blade 14, the HAN File Server 10 may utilize the Compute Blade Bus 30 connection between Blades 14A and 14B to forward network traffic from the functioning corresponding Port 34P on the peer Blade 14 to the Blade 14 in which the Port 34P failed. This facility avoids the necessity of failing the entire Blade 14 as a result of a failure of a single network Port 34P therein and the consequent need to move the file systems supported by that Blade 14. It will be recognized that this facility also accommodates multiple network Port 34P failures on either or both of the Blades 14 as long as the failures occur on different Networks 34, that is, so long as failures to not occur on both of the corresponding pairs of Ports 34P on Blades 14. So long as there is at least one Port 34P on one of the Blades 14 for each Network 34, the clients will see no failures.

The high availability communications mechanisms of a HAN File Server 10 are provided by a Communications Fail-Over Mechanism (CFail) 66 residing in each Blade 14 domain and including separately operating but cooperative mechanisms for communications fault handling with respect to the mechanisms of the Network 48 of each Blade 14 and the Message 42 mechanisms of Blades 14A and 14BA.

First considering the functions and operations of CFail 66 with respect to Network 48, that is, communications between Clients 34C and the Control/Processor Sub-System 14 domain, a CFail 66 may perform an operation referred to as IP Pass Through whereby the failed Network 34 services associated with a Blade 14 are moved to the corresponding non-failed Ports 34P of the opposite, peer Blade 14 and, as described below, are routed through alternate paths through Blades 14. As illustrated in FIG. 3, each CFail 66 includes a Communications Monitoring Process/Protocol Mechanism (CMonitor) 66C residing in the FEP 44F of the Blade 14 that operates to monitor and coordinate all communications functions of Blades 14, including operations of the NetSOS 56 of Blades 14A and 14B, communications through Ports 34P and Networks 34 and communications through the Blade Bus 30 path between Blades 14A and 14B. For purposes of monitoring and fault detection of communications through Ports 34P and Networks 34, each CFail 66 includes a SLIP Interface (SLIP) 66S that operates through the Network 48 and Ports 34P of the Blade 14 in which it resides to exchange Network Coordination Packets (NCPacks) 66P with the opposite, peer Blade 14. NCPacks 66P contain, for example, network activity coordination information and notifications, and are used by CMonitor 66C to detect and identify failed Ports 34P. In particular, each SLIP 66S periodically transmits a beacon NCPack 66P to the SLIP 66S and CMonitor 66C of the opposite, peer Blade 14 through each Network 34 path between the Blades 14. A Network 34 path between the Blades 14 is detected and considered as failed if the CMonitor 66C of a Blade 14 does not receive a beacon NCPack 66P from the opposite, peer Blade 14 through the path during a predetermined failure detection interval, and it is assumed that the failure has occurred in the Port 34P interface of the opposite Blade 14. The predetermined failure detection interval is longer than the interval between NCPack 66P transmissions and is typically less than the CIFS client time-out interval. In an exemplary implementation, this interval may be approximately 5 seconds for a CIFS time-out interval of 15 seconds.

As shown in FIG. 3, each CFail 66 includes an ARP Response Generator (ARPGen) 66G that is responsive to CMonitor 66C to generate unsolicited ARP Responses 66R and a Path Manager (PM) 66M that manages the contents of CREs 48E residing in CRT 48A in accordance with the operations of CFails 66 to manage the redirection of Client 34C communications by Network 48. When the CMonitor 66C of a Blade 14 determines a communications path failure in the peer Blade 14, such as a failure in a Port 34P interface, that information is passed to the ARPGen 66G, which generates a corresponding unsolicited ARP Response 66R to the clients connected from the Port 34P associated with the failure, using the information stored in ARP Table 66T to identify the network addresses of the Clients 34C assigned to or associated with the failure. An ARP Response 66R operates to modify or re-write the information in the ARP tables of the target Clients 34C to re-direct the Clients 34C to the working Port 34P of the pair of corresponding Ports 34P, that is, the Port 34P of the CFail 66 generating the ARP Response 66R. More specifically, an unsolicited ARP Response 66R transmitted by an ARPGen 66G attempts to modify or rewrite the ARP table residing in each such Client 34C to direct communications from those Clients 34C to the corresponding Port 34P of the Blade 14 containing the ARPGen 66G transmitting the ARP Response 66R. Each CFail 66 thereby attempts to redirect the Clients 34C of the failed communications path to the corresponding Port 34P of the Blade 14 in which the CFail 66 resides, thereby resulting, as will be described below, in a redirection of the clients communicating with the failed Port 34P to the functioning corresponding Port 34P of the Blade 14 containing the functioning Port 34P.

In addition, the PM66P of each Blade 14 responds to the operations of the CMonitor 66C and the generation of one or more ARP Responses 66R by the ARPGen 66G by modifying the CREs 48E of CRT 48A corresponding to the Clients 34C that are the target of the ARP Responses 66R. In particular, PM 66M writes a Failed Entry (FE) 48F into the CRE 48E corresponding to each Client 34C to which an ARP Response 66R has been directed, indicating that the communications of the corresponding Client 48C have been redirected, and sets a Passthrough Field (PF) 48P in the CRT 48A to indicate to each Network 48 that the Blades 14 are operating in a mode.

Thereafter, and upon receiving through its own Ports 34P any communication from a Client 34C that is directed to the peer Blade 14, that is, to a client file system supported on the peer Blade 14, the Network 48 will check PF 48P to determine whether the passthrough mode of operation is in effect. If the passthrough mode is in effect, the Network 48 will direct the communication to the peer Blade 14 through the passthrough path comprised of the Blade Bus 30 path between the BEPs 44B of the Blades 14. In addition, and as a result of a redirection as just described, a Network 48 may receive a communication through the Blade Bus 30 passthrough path that was directed to a Port 34P in its Blade 14, but which was redirected through the Blade Bus 30 passthrough path by redirection through the other Blade 14. In such instances, CMonitor 66C and PM 66M will respond to the receiving of such a communication by the Network 48 by modifying the CRE 48E corresponding to the Client 34C that was the source of the communication to route communications to that Client 34C through the Blade Bus 30 passthrough path and the peer Blade 14, thereby completing the redirection of communications in both directions along the path to and from the affected Clients 34C.

It has been described above that in alternate implementations of a HAN File Server 10, each Client 34C may be connected to Ports 34P of the HAN File Server 10 through multiple Networks 34, and the Networks 34 may utilize different technologies, such as local area networks (LANs), wide area networks (WANs), direct processor connections or buses, fiber optic links, or any combination thereof. In these implementations, the CFail 66 mechanisms will operate as described above with regard to detected failures of Network 34 communications, but may additionally select among the available and functioning alternate Network 34 paths between a Client 34C and a Blade 14 having a Port 34P failure, as well as redirecting Client 34C communications to the surviving Blade 14. In this implementation, the CFail 66 mechanisms will modify the Client 34C ARP tables and CREs 48E as described above to redirect the Client 34C communications, but will select among additional options when selecting an alternate path.

It must be noted with regard to IP Pass Through operations as described above that the CFail 66 mechanisms of a HAN File Server 10 do not attempt to identify the location or cause of a connection between Networks 34 and Blades 14. Each CFail 66 instead assumes that the failure has occurred in the Port 34P interface of the opposite Blade 14 and initiates an IP Pass Through operation accordingly, so that IP Pass Through operations for a given communications path may be executed by Blades 14A and 14B concurrently. Concurrent IP Pass Through operations by Blades 14A and 14B will not conflict, however, in the present invention. That is, and for example, if the IP Pass Through operations are a result of a failure in a Port 34P interface of one of Blades 14A and 14B or in a Network 34 link to one of Blades 14A and 14B, the CFail 66 of the Blade 14 in which the failure is associated will not be able to communicate its ARP Response 66R to the Clients 34C connected through that Port 34P or Network 34 link. As a consequence, the CFail 66 of the Blade 14 associated with the failure will be unable to redirect the corresponding Client 34C traffic to its Blade 14. The CFail 66 of the opposite Blade 14, however, that is, of the Blade 14 not associated with the failure, will succeed in transmitting its ARP Response 66R to the Clients 34C associated with the failed path and thereby in redirecting the corresponding Client 34C traffic to its Blade 14. In the event of a failure arising from a partition in the network, both Port 34P interfaces may "bridge" the network partition through the Blade Bus 30 communication path between Blades 14A and 14B, as will be described below, so that, as a result, all Clients 34C will be able to communicate with either of Blades 14A and 14B.

Finally, in the event of a complete failure of either Blade 14A and 14B, IP Pass Through operations are performed through CFails 66 in the manner described above with respect to the assumption of the services of a failed Port 34P by the corresponding surviving Port 34P of the other Blade 14, except that the network services of all of the Ports 34P of the failed Blade 14 are assumed by the corresponding Ports 34P of the surviving Blade 14. It will be understood by those of ordinary skill in the relevant arts, however, that when there is a complete failure of a Blade 14, the TCP connections of the client served by the failed Blade 14 are broken, and must be re-established after the IP Pass Through is complete, after which the services that were available on the failed Blade 14 are available on the surviving Blade 14 and the clients of the failed Blade 14 can re-establish the TCP connections, but to the surviving Blade 14.

Lastly with respect to the operation of the IP Pass Through mechanisms described above, it will be understood that the Network 34 related communications operations supported by a HAN File Server 10 includes broadcast communications as required, for example, by the NetBIOS mechanisms of Network 48, as well as the point to point, or Client 34C to HAN File Server 10, communications discussed above. As will be understood by those of ordinary skill in the relevant arts, broadcast communications differ from point to point communications in being directed to a plurality of recipients, rather than to a specific recipient but, when the Blades 14 are operating in the passthrough mode, are otherwise managed in a manner similar to Client 34C communications. In this case, a Network 48 receiving a broadcast communication will check whether the Blades are operating in passthrough mode, as described above, and, if so, will forward each such broadcast communication to the Network 48 of the opposite Blade 14 through the Blade Bus 30 passthrough path, whereupon the communication will be treated by the other Network 48 in the same manner as a broadcast communication that was received directly.

Lastly with regard to the above, it is known and understood by those of ordinary skill in the arts that the industry standard CIFS specification does not describe or specify the effects of a dropped connection on an application running on a client system. Experience, experimentation and application documentation indicates that the effects of a dropped TCP connection on an application is application dependent and that each handles the failure differently. For example, certain applications direct that clients should retry the operation using the TCP connection and some applications automatically retry the operation, while others report a failure back to the user. As such, the presently preferred implementation of network port failover mechanism incorporates functions to implement these features, including functions in the NetDDs 60 controlling the Ports 34P to support multiple IP addresses, thereby allowing each Port 34P to respond to multiple addresses, and the functionality necessary to transfer IP addresses from a failed Blade 14 and instantiate the IP addresses on the surviving Blade 14. The network port failover mechanism also includes functions, which have been discussed above, to generate and transmit unsolicited ARP Response 66Rs to clients connected to failed Ports 34P to change the IP addresses in the clients ARP tables to point to the new Ports 34P, to interface with availability and failure monitoring functions in other subsystems to know when a complete Blade 14 failure has occurred, and to implement NetBIOS name resolution for the failed Blade 14 resource name.

It will therefore be apparent that the CFail 66 mechanisms of a HAN File Server 10 will be capable of sustaining or restoring communications between Clients 34C and the Blades 14 of the HAN File Server 10 regardless of the network level at which a failure occurs, including at the sub-network level within the Port 34P interfaces of Blades 14A and 14B. The sole requirement is that there be a functioning network communications path and network interface for each Network 34 on at least one of Blades 14A or 14B. The CFail 66 mechanisms of the present invention thereby avoid the complex mechanisms and procedures necessary to identify and isolate the source and cause of network communications failures that are typical of the prior art, while also avoiding the complex mechanisms and operations, also typical of the prior art, that are necessary to coordinate, synchronize and manage potentially conflicting fault management operations.

b. Blade 14/Blade 14 Communications and Fault Handling Mechanisms

It has been described above that the middle layer of communications mechanisms of a HAN File Server 10 includes the communications mechanisms supporting communications between and within the Blade 14A and 14B domains of the Control/Processor Sub-System 14 domain, such as Blade Bus 30 and Messages 42. As described, and for example, the Blade Bus 30 path and Messages 42 are used for a range of HAN File Server 10 administrative and management communications between Blades 14, as a segment of the file transaction processing path in the event of a communications Takeover operation, and in CMirror 54M and LMirror 54L operations.

As discussed and as illustrated in FIG. 2, the Blade Bus 30 communication path between Blades 14 is comprised of Blade Bus 30 and, in each Blade 14, the BE BusSys 38O resident in BEP 44B, which includes such elements as Ser-Des's 38R, FCCs 38Q, P-P Bridges 38H, MCHs 38C and Processors 36A. Although not explicitly shown in FIG. 2, it will be understood that BE BusSys's 38O also include BE BusSys 38O control and communications mechanisms executing in Processor 36A, that is, in BEP 44B, that operate, in general, in the manner well understood by those of ordinary skill in the relevant arts to execute communications operations through BE BusSys's 38O and Blade Bus 30. It will also be understood that Processors 36A and 36B, that is, of the FEP 44F and BEP 44B of each Blade 14, also execute Message 42 control and communications mechanisms, which are not shown explicitly in FIGS. 2 or 3, that operate, in general, in the manner well understood by those of ordinary skill in the relevant arts to execute communications operations through Message 42.

Messages 42, in turn, which provides communications between BEPs 44B and FEPs 44A, are comprised of a shared message communications space in the Memory 38A of each Blade 14, and messaging mechanisms executing in Processors 36A and 36B that, in general, operate in the manner well understood by those of ordinary skill in the relevant arts to execute communications operations through Messages 42.

As indicated in FIG. 3, CFail 66 includes a fault handing mechanism that is separate and independent from SLIP 66S, CMonitor 66C and ARPGen 66G, which function in association with communications into and from the Control/Processor Sub-System 14 domain, for fault handling with respect to communications between and within the Blade 14A and 14B domains of the Control/Processor Sub-System 14 domain, that is. As shown therein, the inter-Blade 14 domain communications fault handling mechanism of CFail 66 includes a Blade Communications Monitor (BMonitor) 66B that monitors the operation of the Blade Bus 30 communication link between Blades 14A and 14B, which includes Blade Bus 30 and the BE BusSys 38O of the Blade 14, and the operation of the Message 42 of the Blade 14, although this connection is not shown explicitly in FIG. 3. First considering Blade Bus 30, in the event of a failure for any reason of the Blade Bus 30 communication path between Blades 14, that is, in Blade Bus 30 or the BE BusSys 38), this failure will be detected by BMonitor 66B, typically by notification from the BE BusSys 38O control mechanisms executing in Processors 36A that an attempted communication through the Blade Bus 30 path has not been acknowledged as received.

In the event of a failure of the Blade Bus 30 communication path, BMonitor 66B will read Blade Routing Table (BRT) 48P, in which is stored information regarding the available communicating routing paths between Blades 14A and 14B. The path information stored therein will, for example, include routing information for communications through Blade Bus 30, but also routing information for the available Networks 34 paths between the Blades 14A and 14B. It will be noted that BRT 48B may be stored in association with CFail 66 but, as shown in FIG. 3, in the presently preferred embodiments of Blades 14 BRT 48B resides in association with Network 48 as the routing path information relevant to Networks 34 is readily available and accessible to Network 48 in the normal operations of Network 48, such as in constructing CRT 48A. BMONITOR 66B will read the routing information concerning the available communications paths between the Blades 14, excluding the Blade Bus 30 path because of the failure of this path, and will select an available Network 34 path between the Networks 48 of the Blades 14 to be used in replacement or substitution for the Blade Bus 30 path. In this regard, it must be noted that BMONITOR 66B modifies the contents of BRT 48B during all IP Pass Through operations in the same manner and currently with PM 66M's modification of the CREs 48E of CRT 48A to indicate nonfunctioning Network 34 paths between Blades 14, so that the replacement path for the Blade Bus 30 path is selected from only functioning Network 34 paths.

BMonitor 66B will then issue a notification to the BE BusSys 38O and Message 42 control and communications mechanisms executing in FEP 44F and BEP 44B that will redirect all communications that would be routed to the Blade Bus 30 path, either directly by BEP 44B or indirectly through Message 42 by FEP 44F, to Network 48 and the Networks 34 path selected by PM 66M.

In the event of a failure of the Blade Bus 30 communication path between Blades 14 for any reason, therefore, the CMonitor 66C and BMonitor 66B mechanisms of CFail 66 will operate to find and employ an alternate communications path for Blade 14 to Blade 14 communications through Networks 34. In this regard, it should again be noted that the CFail 66 mechanisms do not attempt to identify the location or cause of a failure and thereby avoid the complex mechanisms and procedures typically necessary to identify and isolate the source of a failure, and the complex mechanisms and operations typically necessary to coordinate, synchronize and manage potentially conflicting fault management operations.

It must also be noted that the communications failure handling mechanisms of a HAN File Server 10 operate separately and independently of one another, thus again avoiding the use of complex mechanisms and operations to coordinate, synchronize and manage potentially conflicting fault management operations, but cooperatively in handling multiple sources of failure or multiple failures. For example, the operations executed by the CFail 66 Networks 34 failure mechanisms, that is, the CMonitor 66C related mechanisms, are executed independently of the operations executed by the CFail 66 Blade Bus 30 failure mechanisms, that is, the BMonitor 66B related mechanisms, but are executed in a functionally cooperative manner to maintain communications between the Clients 34C and Blades 14 and between Blades 14. Communications are maintained regardless of the sources of the failures or sequence of failures, so long as there is a single finctioning Networks 34 path between Blades 14 and to each Client 34C that are executed in the event of a Blade Bus 30 path failure.

To illustrate, a Networks 34 failure associated with a first one of Blades 14 will result, as described above, result in the redirection of Client 34C communications through the second Blade 14 and to the first Blade 14 through the Blade Bus 30 link between Blades 14 by the CFail 66 Networks 34 failure mechanisms. A subsequent failure of the Blade Bus 30 link will then result in the Client 34 communications that have been redirected through the second Blade 14 and the Blade Bus 30 link in being again redirected from the second Blade 14 and back to the first Blade 14 through an alternate and functioning Networks 34 path between the second and first Blades 14 by the CFail 66 Blade Bus 30 failure mechanisms.

In a further example, if the first failure occurred in the Blade Bus 30 link the communications between the Blades 14 would be redirected, as described above, to an alternate functioning path between the Blades 14 through Networks 34 by the CFail 66 Blade Bus 30 failure mechanisms. If a subsequent failure occurred in this alternate Networks 34 path, this failure would be detected as a Networks 34 related failure and the CFail 66 Networks 34 failure mechanisms of the Blades 14 would first attempt to route the previously redirected communications between Blades 14 through the Bus Blade 30 link. The CFail 66 Blade Bus 30 failure mechanisms would, however, and because the Blade Bus 30 link is inoperative, redirect the previously redirected communications through an available and functioning alternate Networks 34 path between the Blades 14.

It will therefore be apparent that various combinations and sequences of the separate and independent operations executed by the CFail 66 Networks 34 and Blade Bus 30 failure mechanisms may be executed for any combination or sequence of Networks 34 and Blade Bus 30 failures to maintain communications between Clients 34C and the Blades 14 and between the Blades 14. Again, communications will maintained regardless of the sources of the failures or sequence of failures, so long as there is a single functioning Networks 34 path between Blades 14 and to each Client 34C that are executed in the event of a Blade Bus 30 path failure.

Lastly in this regard, it must be noted that a failure may occur in the Message 42 link between the FEP 44F and BEP 44B of a Blade 14. In many instances, this will be the result of a failure that will result in failure of the entire Blade 14, but in some instances the failure may be limited to the Message 42 mechanisms. In the case of a failure limited to the Message 42 mechanisms, the FEP 44F of the Blade 14 in which the failure occurred will not be able to communicate with the BEP 44B of the Blade 14 or with the opposing Blade 14, and the BEP 44B will not be able to communicate with the FEP 44B of the Blade but will be able to communicate with the BEP 44B and FEP 44F of the opposing Blade 14 through the Blade Bus 30 link between the Blades 14.

In a further implementation of the present invention, therefore, the BMonitor 66B of the Blade 14 in which the Message 42 failure occurred will detect an apparent failure of Blade Bus 30 with respect to the FEP 44F, but will not detect a failure of Blade Bus 30 with respect to the BEP 44B. The BMonitor 66B and CMonitor 66C mechanisms of this Blade 14 will thereby redirect all communications from the FEP 44P to the BEP 44B or to the opposing Blade 14 through a Networks 34 path selected by PM 66 and will redirect all communications from the BEP 44B to the FEP 44F to a route through Blade Bus 30 and the Networks 34 path selected for the FEP 44F, but will not redirect BEP 44B communications through Blade Bus 30.

In the Blade 14 in which the failure did not occur, the BMonitor 66B mechanisms will detect an apparent Blade Bus 30 path failure with respect to communications to the FEP 44P of the Blade 14 in which the Message 42 failure occurred but will not detect a Blade Bus 30 path failure with respect to communications to the BEP 44B of that Blade 14. The BMonitor 66B and CMonitor 66C mechanisms of this Blade 44 will thereby redirect all communications directed to the FEP 44F of the opposing Blade 14 through an alternate Networks 34 path, in the manner described, but will not redirect communications directed to the BEP 44B of the opposing Blade 14.

c. Storage Sub-System 12/Blade 14 Fault Handling Mechanisms

As described above, the lowest level of fault handling mechanisms of a HAN File Server 10 includes the communications path structures of Storage Sub-System 12 and the RAIDF 46F mechanisms implemented by RAID 46. RAID file functions are well known and understood by those of ordinary skill in the relevant arts and, as such, will be discussed herein only as necessary for understanding of the present invention. The following will accordingly primarily focus upon the communications path structures within Storage Sub-System 12 and between Sub-System 12 and Blades 14.

As shown in FIG. 1 and as also describe above, Storage Sub-System 12 includes a Drive Bank 16 comprised of a plurality of hard Disk Drives 18, each of which is bi-directionally read/write accessed through dual Storage Loop Modules 20A and 20B. Storage Loop Modules 20A and 20B respectively include MUXBANKs 22A and 22B, each of which includes a plurality of MUXs 24 and Loop Controllers 26A and 26B wherein MUXs 24 and Loop Controller 26 of each Loop Controller Module 20 are bidirectionally interconnected through MUX Loop Buses 28A and 28B. AS shown, MUXBANKs 22A and 22B each include a MUX 24D corresponding to and connected to a corresponding one of Disk Drives 18, so that each Disk Drive 18 of Drive Bank 16 is bidirectionally read/write connected to a corresponding MUX 24D in each of MUX-BANKs 20A and 20B. Each of MUXBANKs 20A and 20B is further bidirectionally connected with the corresponding one of Compute Blades 14A and 14B through MUX 24CA and MUX 24CB, and Compute Blades 14A and 14B are bidirectionally connected through Blade Bus 30.

Each of Disk Drives 18 is therefore bidirectionally connected to a MUX 24D of MUX Bank 22A and a MUX 24D of MUX Bank 22B and the MUXs 24 of MUX Bank 20A are interconnected through a Loop Bus 26A while the MUXs 24 of MUX Bank 22B are interconnected through a Loop Bus 26B, so that each Disk Drive 18 is accessible through both Loop Bus 26A and Loop Bus 26B. In addition, Processor Blade 14A bidirectionally communicates with Loop Bus 26A while Processor Blade 14B bidirectionally communicates Loop Bus 26B and Processor Blades 14A and 14B are directly interconnected and communicate through Blade Loop (Blade) Bus 30.

It will therefore be recognized that the lower level communication fault handling mechanism within Storage Sub-System 12 is essentially a passive path structure providing multiple, redundant access paths between each Disk Drive 18 and Processor Blades 14A and 14B. As such, Processor Blades 14A and 14B may bidirectionally communicate with any of Disk Drives 18, either directly through their associated Loop Bus 26 or indirectly through the other of Processor Blades 14, and may communicate directly with each other, in the event of a failure in one or more communications paths within Storage Sub-System 12. The fault handling mechanisms for faults occurring within one or more Disk Drives 18, in turn, is comprised of the RAIDF 48F mechanisms discussed herein above.

It will also be recognized that the passive path structure of Storage Sub-System 12 operates separately and independently of the communications mechanisms and the CFail 66 Networks 34 and Blade Bus 30 failure mechanisms of Blades 14, but cooperatively with the mechanisms of Blades 14 to ensure communications between Clients 34C and the Disk Drives 18 in which the file systems of Clients 34C reside. Again, these mechanisms provide a high level of file system availability while avoiding the use of complex fault detection, identification and isolation mechanisms and the use of complex fault management coordination, synchronization and management mechanisms.

5. File Transaction Fault Handling Mechanisms of a HAN File Server 10 and Interoperation with the Communications Failure Handling Mechanisms of a HAN File Server 10 (FIGS. 1, 2 and 3)

It has been described herein above that the presently preferred embodiment of a HAN File Server 10 includes a number high availability mechanisms, that is, mechanisms to allow the HAN File Server 10 to continue to provide uninterrupted file server services to clients in the event of a failure of one or more components of the HAN File Server 10. Many of these mechanisms are typical of those currently used in the present art, such as the basic RAIDF 46F functions, and will be well understood by those of ordinary skill in the relevant arts and thus will not be discussed in detail herein unless relevant to the present invention.

In general, however, in the event of the failure of a HAN File Server 10 component, the surviving components in the HAN File Server 10 will, by operation of the high availability mechanisms, take over the tasks and services performed by the failed component and continue to provide those services. It will be appreciated and understood by those of ordinary skill in the relevant arts that there are a number of aspects to the operation of such high availability mechanisms, and that such mechanisms are required to execute several operations in order to accomplish these functions. For example, the high availability mechanisms are required to identify that a component has failed, to transfer or move the resources or functions from the failed components to the surviving components, to restore the state of the resources that were taken over in the surviving components so that the services and functions provided by the failed components are not visibly interrupted, to allow the replacement or correction of the failed component, and to transfer or move the resources back to the failed component after repair.

As has been described above with respect to the communications, file transaction and communications mechanisms of a HAN File Server 10 individually, and as will be described in further detail in following discussions, the high availability mechanisms of a HAN File Server 10 of the present invention operate at a number of different functional levels of the HAN File Server 10. In general, a different group or type of operations and functions are performed at each functional level of a HAN File Server 10 and the high availability mechanisms differ accordingly and operate independently but cooperatively to provide a high level of server availability at each level and for the HAN File Server 10 as a system. The following will discuss the structure and operation of these mechanisms in further detail, and the interoperation of these mechanisms.

For example, the highest level of functionality in a HAN File Server 10 is the communications level that performs client communications tasks and services, that is, communications between the clients and the client file systems supported by the HAN File Server 10 through Networks 34. The core functions of this communications level are provided by the mechanisms of Network 48 and the related components of the HAN File Server 10 and the high availability mechanisms at the communications level include fault detection mechanisms, such as CFail 66, and provide a number of different mechanisms for dealing with a communications level failure. For example, in the event of a failure in communications through one or more Ports 34P of one of Blades 14A and 14B, the CFail 66 of the peer Blade 14 will detect the failure and, in conjunction with Network 48, will redirect all communications between clients and the failed Ports 34P to the corresponding functioning Ports 34P of the peer Blade 14. In the peer Blade 14, the Network 48 therein will route the communications back to the JFile 50 of the Blade 14 having the failed Port 34P through Blade Bus 30, so that failed Ports 34P are bypassed through the Ports 34P of the peer Blade 14 and the inter-Blade 14 communication path comprised of Blade Bus 30 and the FEP 44F-BEP 44P communication path through Message 42. In this regard, and as will be discussed in the next following discussion of the high level file transaction mechanisms of a Blade 14, the high availability mechanisms of Network 48 interoperate with those of the high level file transaction mechanisms to deal with apparent Network 34 related communication failures that, in fact and for example, result from a failure of the JFile 50 of a Blade 14 or of the entire Blade 14.

The next level of functionality in a Blade 14 is comprised of the high level file transaction functions and services wherein the core functions and operations of the high level transaction functions are provided by JFile 50 and the related high level file mechanism. As described above, the high availability mechanisms at the high level file functions level of the HAN File Server 10 include WCache 50C with CMirror 54M and Log 50L with LMirror 54L and these mechanisms operate to deal with failures of the high level file mechanisms within a Blade 14. As described, WCache 50C operates in the conventional manner to cache data transactions and CMirror 54M allows the contents of WCache 54C to be restored in the event of a failure in the FEP 44F affecting WCache 54C. Log 50L, in turn, operates with a Blade 14 to preserve a history of file transactions executed by a JFile 50. Log 50L thereby allows lost file transactions to be re-executed and restored in the event, for example, of a failure in JFile 50 or Storage Sub-System 12 resulting in a loss of file transactions before the transactions have been fully committed to stage storage in the Storage Sub-System 12.

The LMirror 54L mechanisms, however, do not operate within the Blade 14 in which the Logs 50L that the LMirrors 54L mirrors reside, but instead operate across the Blades 14 so that each LMirror 54L mirrors and preserves the contents of the Log 50L of the opposite, peer Blade 14. As a result, the LMirror 54L mechanisms preserve the contents of the opposite, peer Blade 14 Log 50L even in the event of a catastrophic failure of the opposite, peer Blade 14 and permit lost file transactions to be re-executed and restored in the failed Blade 14 when the failed Blade 14 is restored to service.

In addition, it should also be noted that the LMirror 54L mechanisms, by providing a resident history of possibly lost file transactions of a failed Blade 14 within the surviving Blade 14, also allow a surviving Blade 14 to assume support of the clients that had been supported by a failed Blade 14. That is, the Network 48 and JFile 50 of the surviving Blade 14 will assume servicing of the clients previously supported by the failed Blade 14 by redirecting the clients of the failed Blade 14 to the surviving Blade 14, as described above with respect to the Network 48 mechanisms. In this process, and as described above, the Network 48 mechanisms of the surviving Blade 14 will operate to take over the IP addresses of the failed Blade 14by directing the data transactions directed to the assumed IP addresses to the JFile 50 of the surviving Blade 14. The JFile 50 of the surviving Blade 14 will assume the clients of the failed Blade 14 as new clients, with the assumption that the surviving Blade 14 has local file systems, and will thereafter service these assumed clients as its own clients, including recording all assumed data transactions in parallel with the handling of the assumed data transactions. The surviving Blade 14 will use its local recovery log, that is, the LMirror 54L resident in the surviving Blade 14, to record the data transactions of the assumed IP addresses, and may use the file transaction history stored in the resident LMirror 54L to re-execute and reconstruct any lost file transactions of the failed Blade 14 to restore the file systems of the clients of the failed Blade 14 to their expected state,. In this regard, the JFile 50 of the surviving Blade 14 may determine that the "new" clients are clients transferred from the failed Blade 14 either by notification from Network 48, based upon the original address of the file transactions as being directed to the failed Blade 14, or by checking the contents of the resident LMirror 54L to determine whether any "new" client file transactions correlate with file transactions stored therein.

Finally, the lowest level of file transaction functionality in a HAN File Server 10 is comprised of the RAID 46 file transaction functions and services supported by RAID 46. It will be recognized that the RAIDF 46F functions in themselves operate independently of the upper level high availability mechanisms. It will also be recognized, however, that the communication level and high level file transaction mechanisms, in conjunction with the provision of alternate communications paths through, for example, dual Blades 14A and 14B, Loop Buses 26A and 26B, and MUX Loop Buses 28A and 28B, operate cooperatively with the RAIDF 46F functions to enhance accessibility to Disk Drives 18.

It may be seen from the above descriptions, therefore, that the communication level and high level file transaction mechanisms and alternate communications paths provided in a HAN File Server 10 thereby cooperate with the RAIDF 46F functions to enhance the availability of file system shares, that is, storage space, to networked clients. It will also be seen that the communication level and high level file transaction mechanisms and alternate communications paths provided in a HAN File Server 10 achieve these results while avoiding the use of complex fault detection, identification and isolation mechanisms and the use of complex fault management coordination, synchronization and management mechanisms.

In summary, therefore, it may be seen from the above discussions that a number of different mechanisms are used to identify failed components, with the specific mechanism depending upon the component, the sub-system of the HAN File Server 10 in which it resides and the effects on the operation of the HAN File Server 10 of a failure of the component. For example, the RAIDM 46M functions monitor and detect failures in such components as the fans, power supplies, and similar components of Blades 14A and 14B, while the RAIDF 46F functions monitor, detect and correct or compensate for errors and failures in file system operations of Disk Drives 18. It will be recognized that a failure in many of the components monitored by the RAID 46 mechanisms do not compromise the availability of the data at the HAN File Server 10 level as a system, but must be detected and reported through the administrative interface so that action can be taken to repair the component. In a further example, the network management functions of a HAN File Server 10 monitor the state of Networks 34 and the Network 34 communication related components of the HAN File Server 10 and respond to failures in communications between the HAN File Server 10 and the clients of the HAN File Server 10 in ways appropriate to the specific failures. To monitor the network, the network management functions generate self-checks to test the HAN File Server 10's own network communications to determine whether it is communicating with the external network. If, for example, this self-check fails at any network path, then the communications supported by the failed network paths are failed over to another network path as described above. In yet another example, if the RAID 46 functions detect the failure of a Blade 14, this failure is communicated to the file system functions as described above, so that the fail-over procedures can proceed at the file system level as appropriate level can proceed.

The next step in the failure handling process, that is, the movement of the failed resources to surviving resources, is typically performed by reassigning the resource to a known surviving location. In the instance of a failure of a network function, the transfer will be to a previously identified a network adapter that is capable of assuming the functions of the failed device, again as described above, and, in the instance of a failed Blade 14, the peer Blade 14 will assume the file systems from the failed Blade 14.

The transfer of resources from a failed component to a surviving component may require an alteration of or modification to the operational state of the resource before the resource can be made available on the surviving component. For example, in the case of a failed network component, a new network address must be added to an existing adapter and, in the instance of a failure effecting the file system, such as a failure of a Blade 14, the transaction log is replayed to replace data that may have been lost in the failure.

As described previously, many of the components of the HAN File Server 10 are hot swappable, meaning that they can be removed from the HAN File Server 10 and replaced with a working component. Once the component been replaced, the resources that were taken over by the surviving components must be returned to the original component, that is, to the replacement for the original component. Recovery mechanisms in the appropriate sub-system, such as described above, will accordingly move the resources that were transferred to the surviving component back to the replacement component, a process that is typically initiated manually by the system administrator and at a time when the interruption in service is acceptable and manageable.

B. Detailed Description of the Present Invention
(FIG. 4)

Having described the structure and operation of a HAN File Server 10 in which the present invention may be implemented and certain aspects of the present invention as implemented, for example, in a HAN File Server 10, the following will focus on and describe the present invention in further detail. Referring to FIG. 4, therein is illustrated a block diagram of the structure and operation of the present invention as implemented in a File Server System 70 wherein File Server System 70 is implemented, for example, in a HAN File Server 10. It will be recognized from an examination of FIG. 4 that File Server System 70 is based upon HAN File Server 10 and that FIG. 4, which illustrates an implementation of File Server System 70, is based upon, for example, FIGS. 1, 2 and 3 herein above, but modified to focus on the structure, elements and operation of the present invention. The correlation and relationships between the elements and operation of File Server System 70 and a HAN File Server 10 will be discussed in the following description of the present invention.

As described herein above, the present invention is directed to a high level mirrored transaction log mechanism implemented in a dual processor file server to provide fault tolerant, low latency data transaction recovery. As shown in FIG. 4, the high level mirrored transaction log mechanism of the present invention may implemented in a File Server System 70 that includes dual, peer File Servers 72A and 72B, exemplified by Blades 14A and 14B of a HAN File Server 10, or in a system imploying a single File Server 72, wherein File Servers 72A and 72B provide file server services to corresponding groups of Clients 74C, for example, through Networks 34. As described herein above with respect to Blades 14A and 14B of a HAN File Server 10, in normal operation each of File Servers 72A and 72B supports a separate and distinct group of Clients 74C and exports, or supports, a distinct set of Client File Systems (CFiles) 74F for each group of Clients 74C. That is, and in the presently preferred embodiment of File Server System 70, there are no CFiles 74F shared between File Servers 72A and 72B.

Figure 4:
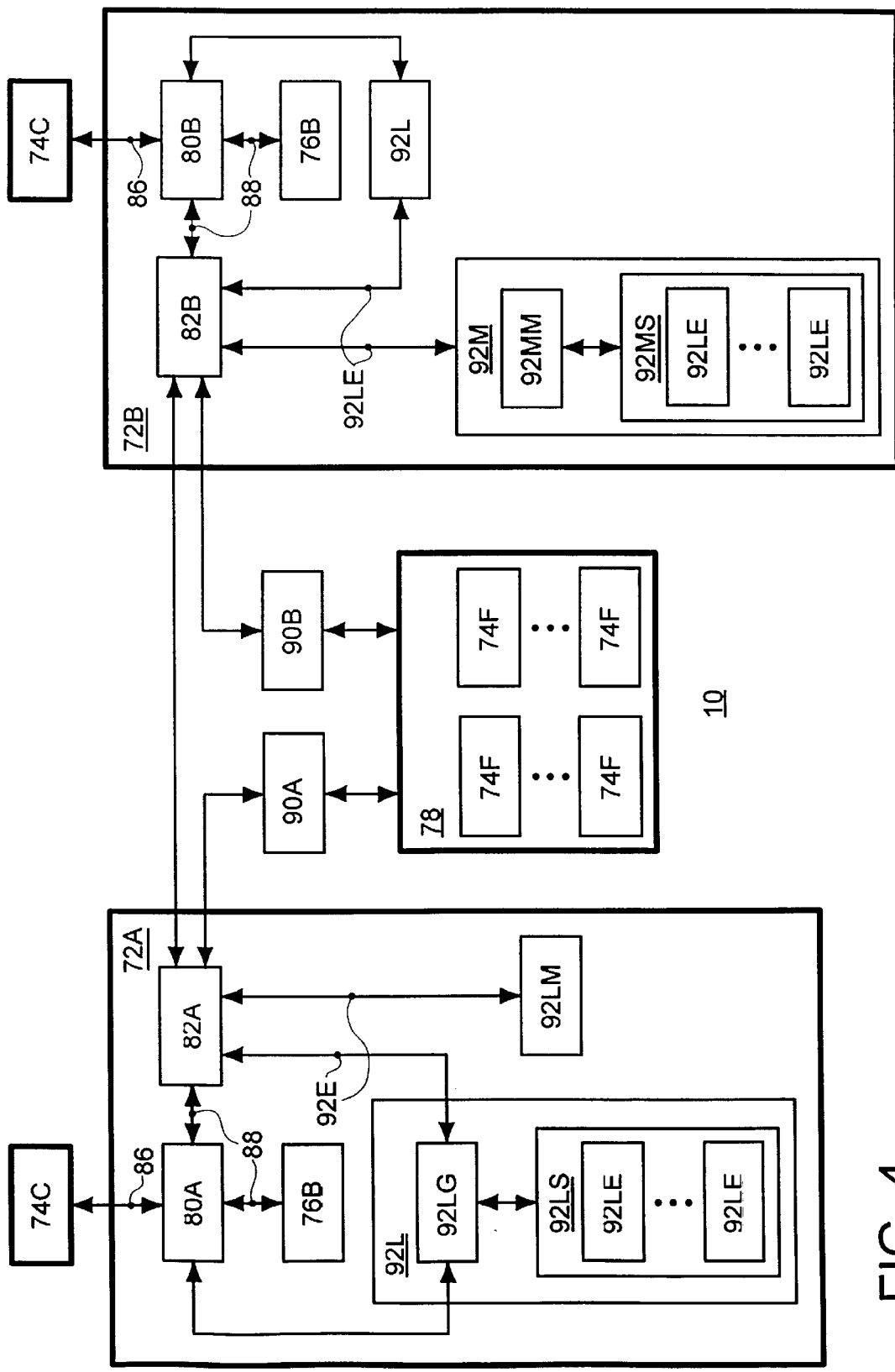
FIG. 4 is a detailed block diagram of the present invention.

As represented in FIG. 4, File Server Processors 72A and 72B are provided with separate memory spaces represented by Memories 76A and 76B and exemplified by Memories 38D of Blades 14A and 14B. In the presently preferred implementation, File Server Processors 72A and 72B share a Stable Storage 78, as exemplified by Storage Sub-System 12, which may be implemented with RAID technology. For purposes of the present invention, the lower levels of the HAN File System 10, including Internal Write Cache (WCache) 50C and the file system mechanisms of RAID 46 residing and executing on the Back-End Processor (BEP) 44B of the Blade 14, may be functionally regarded as components of Stable Storage 78.

As also shown, each of File Server 72 includes a File System Processor (FSP) 80, represented as FSPs 80A and 80B, executing the file system transactions operations requested by Clients 74C and a Communications Processor (CP) 82, represented as CPs 82A and 82B, supporting a high speed Communication Link (CLink) 84 between File Servers 72A and 72B and, in particular with respect to the present invention, between Memories 76A and 76B. In the exemplary implementation described herein above as a HAN File Server 10, each FSP 80 may be regarded as functionally comprised of the higher level file system functions provided by JFile 50 residing and executing on the Front-End Processor (FEP) 44F of a Blade 14. As stated above, WCache 50C and the file system mechanisms of RAID 46 residing and executing on the Back-End Processor (BEP) 44B of the Blade 14 may be functionally regarded as a component of Stable Storage 78 for purposes of the present invention. CP 82 and CLink 84, in turn, may be respectively comprised of the Back-End Bus Sub-Systems (BE BusSys's) 380 residing and operating on the BEPs 44B of the Blades 14A and 14B and Compute Blade Loop Bus 30 interconnecting the Blades 14A and 14B.

As described previously, JFile 50 is a journaled file system that receives and processes Requests 86 from Clients 74C for file system transactions, converting the Requests 86 into corresponding File System Operations (FSOps) 88. The FSOps 88 are then committed to Stable Storage 78 as file system changes by a Commit Mechanism (Commit) 90, represented by Commits 90A and 90B, using conventional delayed commit methods and procedures, as are well understood by those of ordinary skill in the relevant arts, and which typically involve WCache 50C and RAID 46.

In this regard, in a conventional file server of the prior art a Request 86 from a Client 74C will typically be acknowledged to the Client 74C as completed when the FSP 80 has accepted the Request 86 or when the FSP 80 has transformed the Request 86 into corresponding FSOps 88. In either instance, the data transaction will be acknowledged to the Client 74C as completed before the Commit 90 has completed the delayed commit operations necessary to commit the data transaction to Stable Storage 78, and while the data transaction still resides in the FSP 80 memory space. As a consequence, a failure in the FSP 80 or of the File Server 72 in which the FSP 80 resides that affects FSP 80 memory space, that is, Memory 76, will result in loss of the data transaction and any data involved in the data transaction.

Further in this regard, it has been described herein above that a file server may include a transaction log for storing information pertaining to requested data transactions, such as the Transaction Log (Log) 5OL of HAN File Server 10. A transaction log will store the information regarding each data transaction for the period required to execute the transaction, or may store a history of present and past data transactions, and allows stored transactions to be re-executed. Transaction logs thereby protect against the loss of data transaction during the delayed commit operations for certain types of failures, for example, due to a Disk Drive 18 failure or an error in the commit operations. A failure in the FSP 80 or of the File Server 72 in which the FSP 80 resides that affects FSP 80 memory space, however, may also result in a loss of the transaction log and thereby of the data transaction stored therein. It should also be noted that the transaction logs of file server systems of the prior art typically store representations of the data transactions at a relatively low level of file server functionality, typically below the FSOp 88 level of operation and often at the levels of operations performed by Commit 90. As such, the amount of information that must be stored for each transaction is substantial, and it is correspondingly difficult and complex to reconstruct and re-execute a data transaction. Also, and because transactions are logged at a low level of the file system operations, the latency of the file server, that is, the delay before a transaction can be acknowledged to the client and completed to stable storage, is increased, as is the possibility that a data transaction will be lost because of a failure during the logging process.

According to the present invention, these problems of the prior art are avoided through operation of high level transaction log mechanisms residing in each of the dual, peer file servers and communicating with transaction log mirror mechanisms residing in the opposite, peer file server through a high speed communications link. This transaction log and mirroring mechanism is embodied in File Server System 70 by Transaction Log Mechanisms (TRLogs) 92L and Transaction Log Mirror mechanisms (TLMirrors) 92M implemented in each of dual File Servers 72A and 72B wherein each TRLog 92L communicates with the corresponding TRMirror 92M in the opposite, peer File Server 72 through the CPs 82 of each of File Servers 72 and CLink 84. The TLLogs 92L and TLMirrors 92M of the present invention are respectively exemplified in HAN File Server 10 by the previously described Transaction Logs (Logs) 50L residing in JFiles 50 in the FEPs 44F of each of Blades 14 and communicating with the corresponding Log Mirror Mechanisms (LMirrors) 54LA and 54LB residing in the BEPs 40B of the opposing Blades 14. CPs 82 and CLink 84, in turn, are respectively exemplified by the BE BusSys's 38O residing and operating on the BEPs 44B of Blades 14A and 14B and Compute Blade Loop Bus 30 interconnecting Blades 14A and 14B. Further in this regard, it will be recognized by those or ordinary skill in the arts that the present invention may be implemented in a system incorporating a single File Server 72 wherein the LMirror 64L may reside in any other domain of the system in such a manner as to survive a failure of the File Server 72.

As illustrated in FIG. 4, TLLogs 92L are each comprised of a Log Generator (LGen) 92LG for generating Log Entries (LEnts) 92LE representing requested data transactions and a Log Store (LogS) 92LS for storing LEnts 92E wherein the depth of LogSs 92LS will depend upon the number of data transactions to be journaled, as which will be discussed further below. TLMirrors 92M, in turn, are each comprised of a Mirror Store (MirrorS) 92MS for storing LEnts 92LE transmitted from the corresponding TLLog 92L and a Mirror Manager (MirrorM) 92MM for storing LEnts 92LE in the MirrorS 92MS and for reading LEnts 92LE from the MirrorS 92MS for reexecution by the FPS 80 originating the LEnts 92LE. As will be described below, in alternate embodiments of the present invention the surviving one of dual File Servers 72 may assume the Clients 74C and CFiles 74F of the failed File Server 72. In these embodiments, the LEnts 92LE of a failed File Server 72 may be read from the TLMirror 92M of the surviving File Server 72 and the data transactions represented by the LEnts 92LE re-executed by the surviving File Server 72 to restore and reconstruct the states of the CFiles 74F of the assumed Clients 74C of the failed File Server 72.

As shown in FIG. 4, the LGen 92LG of each TLLog 92L monitors and extracts information regarding data transactions at the upper level of File Server 72 operations, such as at the Request 86 level of operations, at an intermediate point between the Request 86 level of operation and the level at which Requests 86 are converted into corresponding File System Operations (FSOps) 88, or at the FSOps 88 level of operation. As represented in diagrammatic form in FIG. 4, therefore, each LEnt 92LE a will include a Transaction Field (TR) 94T identifying or specifying the nature of the data transaction. Although the system does not track clients at the transaction level in the presently preferred embodiment, the system may do so in alternate embodiment and, in such cases and may include, for example, include a Client File Field (CF) 94C identifying the CFile 74F to which the data transaction pertains and possibly the Client 74C requesting the data transaction. A LEnt 92LE will also typically include a Data Identifier Field (DI) 94I identifying the data involved in the data transaction in the instance of a data write operation, that is, a data address or other form of identifier, and, in the instance of a data write transaction, may include a Data Field (DA) 94D containing a copy of the data to be written into the CFile 74F. It will be understood by those of ordinary skill in the relevant arts that the contents of LEnts 92LE will vary from implementation to implementation and will depend upon, for example, the specific file systems used in the file server system, the operations supported, the specific level of File Server 72 operations that LEnts 92LE are generated, and so on. For example, the contents of TR 94T will depend upon the level of File Server 72 at which the information pertaining to the data transactions is extracted from flow of operations and may vary from the contents of the appropriate Request 86 field, that is, may be a single command or operation designator or instruction, to being a sequence or group of instructions or commands defining or identifying the high level operations necessary to executing the Request 86. It is necessary and sufficient, however, that the contents of LEnts 92LE allow each data transaction to be reconstructed and re-executed. It will be appreciated and understood by those of ordinary skill in the relevant arts, however, that the volume and complexity of information comprising a LEnt 92LE and defining a data transaction will be significantly less than is necessary to similarly define a data transaction when extracted from the operation flow at a lower level, such as at the Commit 90 and Stable Storage 78 level, as is typical in file server systems of the prior art.

As indicated in FIG. 4, the LEnts 92LE generated by LGen 92LG are stored in the resident LogS 92LS in the conventional manner and it will be understood that the depth of LogS 92LS, that is, the number of LEnts 92LE that may be stored therein, will depend upon the length of data transaction history to be preserved. In general, the depth of LogS 92LS, that is, the number of LEnts 92LE that may be stored therein, should be sufficient to store the maximum number of data transactions that may occur during the maximum latency period of the File Server 72, that is, the maximum period that may occur between the receiving of a Request 86 and completion of the commitment of the data transaction to Stable Storage 78.

In addition, however, and according to the present invention, in each of File Servers 72A and 72B each LEnt 92LE generated by LGen 92LG in response to a received Request 86 is transmitted through the high speed communications link comprised of the CPs 82 of each of File Servers 72 and CLink 84 to the TLMirror 92M in the other File Server 72, wherein the MirrorM 92MM of the TLMirror 92M receiving the LEnt 92LE will store the LEnt 92LE in the MirrorS 92MS. Again, the depth of MirrorS 92MS should be sufficient to store the maximum number of data transactions that may occur during the maximum latency period of the File Server 72, which is the maximum period that may occur between the receiving of a Request 86 and completion of the commitment of the data transaction to Stable Storage 78. It will be recognized, however, that the depth of MirrorS 92MS may be greater, or less, depending upon the length of data transaction history desired.

In the presently preferred embodiment of the invention, the acknowledgment of receipt and acceptance of a data transaction to the Client 74C originating the Request 86 is not generated directly by the FSP 80 receiving the Request 86. Instead, the MirrorM 92MM will return an acknowledgment to the LGen 92LG that was the source of the LEnt 92LE after the TLMirror 92M has received and stored a LEnt 92LE, and the LGen 92LG will notify the FSP 80 of the acknowledgment. The FSP 80 then will generate a corresponding acknowledgment to the corresponding Client 74C that the data transaction was accepted and completed.

It will be recognized that the delay in generating an acknowledgment to the Client 74C may be slightly greater than the delay required for the FSP 80 to generate an acknowledgment directly by, for example, the transmission time of the LEnt 92LE to the MirrorM 92MM and the transmission time of the return acknowledgment. It will be recognized, however, that the latency period required to securely store the LEnt 92LE corresponding to a Request 86 in the TLMirror 92M through the high speed communications link between File Servers 72 will typically be significantly less than the latency period required to commit the data transaction to Stable Storage 78. The latency period required to securely store the LEnt 92LE will also typically be significantly less than the time required to securely store an LEnt 92LE generated at a lower level in a FSP 80 in a LogS 92LS, as in the systems of the prior art, thus significantly reducing the vulnerability period in which a data transaction may be lost due to a failure in the FSP 80.

It will also be recognized, however, that the latency period required to securely store the LEnt 92LE corresponding to a Request 86 in the TLMirror 92M through the high speed communications link between File Servers 72 will be masked by the latency period of the normal input/output processing of the file system so long as the transmission speed of the high speed communications link is sufficiently high. In the present exemplary HAN File Server 10, for example, this link is through a fiber optic link, but the actual speed of the communications link is not critical so long as this requirement is met. As such, the latency period of TLMirror 92M operations will not be visible to a Client 74C, being masked by the data transaction processing time of the FSP 80, and File Servers 72 will not suffer an apparent performance penalty from the transaction log mechanism of the present invention.

Lastly, it will be understood that, as described above, the TLMirror 92M for a given File Server 72 will preserve at least the uncompleted, that is, uncommitted, data transactions pending in that File Server 72 upon the event of a failure in that File Server 72. Thereafter, and after the mechanisms of the failed File Server 72 restore the state and operation of the failed File Server 72, as described herein above with respect to HAN File Server 10, the TLMirror 92M will read the stored LEnts 92LE from the MirrorS 92MS and back to the recovered File Server 72 for re-execution. The reexecution of the data transactions represented by and defined by the LEnts 92LE will thereby restore the state of the CFiles 74F supported by the failed File Server 72 to the states expected by the Clients 74C, and normal operation may resume from that point.

In alternate embodiments, and as described above with respect to the exemplary HAN File Server 10, the surviving one of dual File Servers 72 may assume the Clients 74C and CFiles 74F of the failed File Server 72 by operation of the fail-over mechanisms described with regard to HAN File Server 10. In these embodiments, the communications links to the Clients 74C supported by the failed File Server 72 will be transferred to the surviving File Server 72, as will the CFiles 74F of the failed File Server 72. The FSP 80 of the surviving File Server 72 will then read the LEnts 92LE of the failed File Server 72 from the TLMirror 92M, and the data transactions represented by the LEnts 92LE will be re-executed by the surviving File Server 72 to restore and reconstruct the states of the CFiles 74F of the assumed Clients 74C of the failed File Server 72.

It will be apparent to those of ordinary skill in the relevant arts that the present invention may be implemented for any form of shared resource requiring reliable communications with clients and the preservation and recovery of data or operational transactions, such as a communications server, various types of data processor servers, print servers, and so on, as well as the file server used as an example herein. It will also be apparent that the present invention may be likewise adapted and implemented for other implementations of file servers using, for example, different RAID technologies, different storage technologies, different communications technologies and other information processing methods and techniques, such as image processing. The adaptation of the present invention to different forms of shared resources, different resource managers, different system configurations and architectures, and different protocols will be apparent to those of ordinary skill in the relevant arts.

It will therefore be apparent to those of ordinary skill in the relevant arts that while the invention has been particularly shown and described herein with reference to preferred embodiments of the apparatus and methods thereof, various changes, variations and modifications in form, details and implementation may be made therein without departing from the spirit and scope of the invention as defined by the appended claims, certain of which have been described herein above. It is therefore the object of the appended claims to cover all such variation and modifications of the invention as come within the true spirit and scope of the invention.

What is claimed is:

1. A file server providing file system shares to clients by performing file transaction operations in response to file transaction requests by the clients and including a transaction logging mechanism, comprising:
   a storage sub-system for storing client file system shares, and
   a control/processing sub-system, the control/processing sub-system including
      a first blade processor including
         a first file system processor performing high level file transaction operations including transforming file transaction requests from clients into corresponding low level file transaction operations, and
         a first transaction logging mechanism, including
            a first log generator for extracting high level file transaction operation information relating to each file transaction request directed to the first blade processor, and
            a first transaction log for storing the high level file transaction operation information, wherein
            the first log generator is responsive to the restoration of operation of the file server after a failure of file server operations in the first blade processor for reading the high level file transaction operation information relating to each file transaction request directed to the first blade processor from the transaction log and restoring the state of execution of file transactions directed to the first blade processor.

2. The transaction logging mechanism of claim 1, wherein:
   the high level file transaction operation information relating to each file transaction request directed to the first blade processor is extracted before the corresponding file transaction is completed by the first file system processor, and wherein
   a client file transaction request is acknowledged as accepted by the file server after the high level file transaction operation information is stored in the first transaction log.

3. The transaction logging mechanism of claim 1, wherein the transaction logging mechanism further comprises:
   a first transaction log mirroring mechanism located separately from the first blade processor and communicating with the first log generator for receiving and storing mirror copies of the high level file transaction operation information relating to each file transaction request directed to the first blade processor, wherein
   the first transaction log mirroring mechanism is responsive to the restoration of operation of the file server after a failure of file server operations in the first blade processor for reading the high level file transaction operation information relating to each file transaction request directed to the first blade processor from the first transaction log mirroring mechanism and restoring the state of execution of file transactions directed to the first blade processor.

4. The file server providing file system shares to clients by performing file transaction operations and including a transaction logging mechanism of claim 1, wherein:
   the control/processing sub-system further includes
      a second blade processor operating in parallel with the first blade processor and including
         a second file system processor performing high level file transaction operations including transforming file transaction requests from clients to the second blade processor into corresponding low level file transaction operations, and
         a second transaction logging mechanism, including
            a second log generator for extracting high level file transaction operation information relating to each file transaction request directed to the second blade processor, and
            a second transaction log for storing the high level file transaction operation information relating to each file transaction request directed to the second blade processor, wherein
            the second log generator is responsive to the restoration of operation of the file server after a failure of file server operations in the second blade processor for reading the high level file transaction operation information relating to each file transaction request directed to the second blade processor from the transaction log and restoring the state of execution of file transactions directed to the second blade processor, a first transaction log mirroring mechanism residing in the second blade processor and communicating with the first log generator for receiving and storing mirror copies of the high level file transaction operation information, the first transaction log mirroring mechanism being responsive to the restoration of operation of the file server after a failure of file server operations in the first blade processor for reading the high level file transaction operation information from the first transaction log mirroring mechanism and restoring the state of execution of file transactions directed to the first blade processor and represented in the first transaction log mirroring mechanism, and a second transaction log mirroring mechanism residing in the first blade processor and communicating with the second log generator for receiving and storing copies of the high level file transaction operation information relating to each file transaction request directed to the first blade processor, wherein the second transaction log mirroring mechanism is responsive to the restoration of operation of the file server after a failure of file server operations in the second blade processor for reading the high level file transaction operation information from the second transaction log mirroring mechanism and restoring the state of execution of file transactions directed to the second blade processor and represented in the second transaction log mirroring mechanism.

5. The transaction logging mechanism of claim 4, wherein:

the high level file transaction operation information relating to each file transaction request directed to a blade processor is extracted by the corresponding transaction logging mechanism before the corresponding file transaction is completed by the file system processor, and wherein a client file transaction request is acknowledged as accepted by the file server after the high level file transaction operation information is stored in the corresponding transaction log mirroring mechanism.

6. A system resource providing system resource services to clients by performing system resource operations in response to system resource requests by the clients and including a transaction logging mechanism, comprising:

a resource sub-system for performing low level system resource operations, and a control/processing sub-system, the control/processing sub-system including a first blade processor including a first system resource processor performing high level system resource operations including transforming system resource requests from clients into corresponding low level system resource operations, and a first transaction logging mechanism, including a first log generator for extracting high level system resource operation information relating to each system resource request directed to the first blade processor, and a first transaction log for storing the high level system resource operation information relating to each system resource request directed to the first blade processor, wherein the first log generator is responsive to the restoration of operation of the system resource after a failure of system resource operations in the first blade processor for reading the high level system resource operation information relating to each system resource request directed to the first blade processor from the transaction log and restoring the state of execution of system resource requests directed to the first blade processor.

7. The transaction logging mechanism of claim 6, wherein:

the high level system resource operation information relating to each system resource request directed to the first blade processor is extracted before the corresponding system resource is completed by the first system resource processor, and wherein a client system resource request is acknowledged as accepted by the system resource after the high level system resource operation information is stored in the first transaction log.

8. The transaction logging mechanism of claim 6, wherein the transaction logging mechanism further comprises:

a first transaction log mirroring mechanism located separately from the first blade processor and communicating with the first log generator for receiving and storing mirror copies of the high level system resource operation information relating to each system resource request directed to the first blade processor, wherein the first transaction log mirroring mechanism is responsive to the restoration of operation of the system resource after a failure of system resource operations in the first blade processor for reading the high level system resource operation information relating to each system resource request directed to the first blade processor from the first transaction log mirroring mechanism and restoring the state of execution of system resource requests directed to the first blade processor.

9. The system resource providing system resource shares to clients by performing system resource operations and including a transaction logging mechanism of claim 6, wherein:

the control/processing sub-system further includes a second blade processor operating in parallel with the first blade processor and including a second system resource processor performing high level system resource operations including transforming system resource requests from clients to the second blade processor into corresponding low level system resource operations, and a second transaction logging mechanism, including a second log generator for extracting high level system resource operation information relating to each system resource request directed to the second blade processor, and a second transaction log for storing the high level system resource operation information relating to each system resource request directed to the second blade processor, wherein the second log generator is responsive to the restoration of operation of the system resource after a failure of system resource operations in the second blade processor for reading the high level system resource operation information relating to each system resource request directed to the second blade processor from the transaction log and restoring the state of execution of system resources directed to the second blade processor, a first transaction log mirroring mechanism residing in the second blade processor and communicating with the first log generator for receiving and storing mirror copies of the high level system resource operation information relating to each system resource request directed to the first blade processor, wherein the first transaction log mirroring mechanism is responsive to the restoration of operation of the system resource after a failure of system resource operations in the first blade processor for reading the high level system resource operation information relating to each system resource request directed to the first blade processor from the first transaction log mirroring mechanism and restoring the state of execution of system resources directed to the first blade processor, and a second transaction log mirroring mechanism residing in the first blade processor and communicating with the second log generator for receiving and storing copies of the high level system resource operation information relating to each system resource request directed to the second blade processor, wherein the second transaction log mirroring mechanism is responsive to the restoration of operation of the system resource after a failure of system resource operations in the second blade processor for reading the high level system resource operation information relating to each system resource request directed to the second blade processor from the second transaction log mirroring mechanism and restoring the state of execution of system resource requests directed to the second blade processor.

10. The transaction logging mechanism of claim 9, wherein:

the high level system resource operation information relating to each system resource request directed to a blade processor is extracted by the corresponding transaction logging mechanism before the corresponding system resource is completed by the system resource processor and the system resource is committed to execution in the resource sub-system, and wherein a client system resource request is acknowledged as accepted by the system resource after the high level system resource operation information is stored in the corresponding transaction log mirroring mechanism and while the requested system resource is being committed to execution in the resource sub-system.

11. A method for logging system resource transactions and restoring the state of execution of system resource requests in a shared system resource providing system resource services to clients in response to system resource requests by the clients, the system resource including a resource sub-system for performing low level system resource operations and a control/processing sub-system including a first blade processor, the first blade processor including a first system resource processor performing high level system resource operations including transforming system resource requests from clients into corresponding low level system resource operations, and a first transaction logging mechanism, comprising the steps of:

in the first blade processor,
extracting high level system resource operation information relating to each system resource request directed to the first blade processor, and
storing the high level system resource operation information relating to each system resource request directed to the first blade processor, and
in response to the restoration of operation of the system resource after a failure of system resource operations in the first blade processor, reading the high level system resource operation information relating to each system resource request directed to the first blade processor restoring the state of execution of system resource requests directed to the first blade processor.

12. The method for logging system resource transactions and restoring the state of execution of system resource requests of claim 11, wherein:

the high level system resource operation information relating to each system resource request directed to the first blade processor is extracted before the corresponding system resource is completed by the first system resource processor, and wherein a client system resource request is acknowledged as accepted by the system resource after the high level system resource operation information is stored in the first transaction log.

13. The method for logging system resource transactions and restoring the state of execution of system resource requests of claim 11, further comprising the steps of:

receiving and storing mirror copies of the high level system resource operation information relating to each system resource request directed to the first blade processor separately from the first blade processor,
in response to the restoration of operation of the system resource after a failure of system resource operations in the first blade processor, reading the mirror copies of the high level system resource operation information relating to each system resource request directed to the first blade processor.

14. The method for logging system resource transactions and restoring the state of execution of system resource requests of claim 11, wherein the control/processing sub-system further includes a second blade processor operating in parallel with the first blade processor, the second blade processor including a second system resource processor performing high level system resource operations including transforming system resource requests from clients to the second blade processor into corresponding low level system resource operations, further comprising the steps of:

in the second blade processor,
extracting high level system resource operation information relating to each system resource request directed to the second blade processor, and
storing the high level system resource operation information relating to each system resource request directed to the second blade processor, and
receiving and storing the mirror copies of the high level system resource operation information relating to each system resource request directed to the first blade processor, and in the first blade processor,
receiving and storing the mirror copies of the high level system resource operation information relating to each system resource request directed to the second blade processor, and in the second blade processor,
> in response to the restoration of operation of the system resource after a failure of system resource operations in the second blade processor,
>> reading the high level system resource operation information relating to each system resource request directed to the second blade processor and restoring the state of execution of system resource requests directed to the second blade processor, or
>> reading the mirror copies of the high level system resource operation information relating to each system resource request directed to the second blade processor from the first blade processor to the first blade processor.

15. A high level transaction logging mechanism for use in a shared system resource that includes a processor responsive to requests for resource operations for translating the requests for resource operations into high level resource operations and a resource subsystem responsive to each high level operation for performing corresponding low level system resource operations, comprising:
- a log generator for extracting high level operation information relating to each high level operation, and
- a transaction log for storing the high level operation information, wherein
  - the logging mechanism is responsive to restoration of operation of the system resource after a failure of the shared system for reading the high level operation information from the transaction log and restoring the state of execution of the first processor.

16. A high level transaction logging mechanism for use in a shared system resource that includes first and second processors responsive to requests for resource operations for translating the requests for resource operations into high level operations and a resource sub-system responsive to each high level operation for performing corresponding low level operations, comprising:
  in each processor,
  - a log generator for extracting high level operation information relating to each high level operation of the processor, and
  - a transaction log for storing the high level operation information, wherein
    - the logging mechanism is responsive to restoration of operation of the system resource after a failure of the shared system for reading the high level operation information from the transaction log and restoring the state of execution of the processor, and
  - a transaction log mirroring mechanism communicating with the log generator of the other processor for receiving and storing mirror copies of the high level operation information of the other processor, wherein
    - the transaction log mirroring mechanism is responsive to the restoration of operation of the other processor after a failure of the other processor for reading the mirror copies of the high level operation of the other processor to the other processor and restoring the state of execution of the other processor.

* * * * *

UNITED STATES PATENT AND TRADEMARK OFFICE
CERTIFICATE OF CORRECTION

PATENT NO. : 6,578,160 B1 Page 1 of 1
DATED : June 10, 2003
INVENTOR(S) : Eric Trounson MacHardy, Jr. and Miles Aram It is certified that error appears in the above-identified patent and that said Letters Patent is hereby corrected as shown below:

<u>Title page,</u>
Insert item:
--[73]   Assignee:  EMC Corporation, Hopkinton, MA (US) --

Signed and Sealed this

Twenty-seventh Day of April, 2004

JON W. DUDAS
*Acting Director of the United States Patent and Trademark Office*